US006567079B1

(12) United States Patent
Smailagic et al.

(10) Patent No.: US 6,567,079 B1
(45) Date of Patent: *May 20, 2003

(54) PORTABLE COMPUTER SYSTEM WITH ERGONOMIC INPUT DEVICE

(75) Inventors: Asim Smailagic, Pittsburgh, PA (US); Daniel P. Siewiorek, Pittsburgh, PA (US); John M. Stivoric, Pittsburgh, PA (US); Drew Anderson, Pittsburgh, PA (US); Randall W. Casciola, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/394,778

(22) Filed: Sep. 13, 1999

Related U.S. Application Data

(63) Continuation-in-part of application No. 08/960,541, filed on Oct. 31, 1997, now Pat. No. 5,959,611, which is a continuation of application No. 08/399,203, filed on Mar. 6, 1995, now abandoned.

(51) Int. Cl.[7] .................................................. G09G 5/00
(52) U.S. Cl. ........................................ 345/184; 345/156
(58) Field of Search ................................ 345/156, 157, 345/184; 704/270, 271, 275; 707/500, 501, 513; 341/20–22

(56) References Cited

U.S. PATENT DOCUMENTS

| 4,561,049 A | | 12/1985 | Deleganes et al. |
| 5,012,231 A | * | 4/1991 | Felsenstein .................. 345/161 |
| 5,095,303 A | | 3/1992 | Clark et al. |
| 5,105,338 A | | 4/1992 | Held |
| 5,305,244 A | | 4/1994 | Newman et al. |
| 5,305,449 A | | 4/1994 | Ulenas |
| 5,438,530 A | | 8/1995 | Bettini |
| 5,459,462 A | | 10/1995 | Venkidu et al. |

(List continued on next page.)

OTHER PUBLICATIONS

A. Smailagic and D.P. Siewiorek, "The CMU Mobile Computers: A New Generation of Computer Systems," *IEEE Digest of Papers*, IEEE Computer Society Press, Feb. 28–Mar. 4, 1994.

"Rotating Icon Selector", *IBM Technical Disclosure Bulletin*, vol. 37, No. 7 Jul. 1994.

Anthony Ralston, "Encyclopedia of Computer Science", 1995 p. 182.

(List continued on next page.)

*Primary Examiner*—Richard Hjerpe
*Assistant Examiner*—Alexander Eisen
(74) *Attorney, Agent, or Firm*—Kirkpatrick & Lockhart LLP

(57) ABSTRACT

A portable computer system with an ergonomic input device is comprised of a housing having a top surface. A central processing unit is carried in the housing. A heads-up display is provided for displaying information to a user, with certain of the information being selectable by the user. The display is under the control of the central processing unit. A first rotary switch produces a first input signal for identifying the information to be selected. A second input switch produces a second input signal for selecting the identified information. Both the first and second input switches are carried on the top surface of the housing. An input interface receives the first and second input signals and encodes the information therein into an eight bit byte for input to the central processing unit. In one embodiment, the housing may be carried in a case which is worn by the user while the heads-up display is positioned proximate to the user's eye by a headband. The portable computer system can be used to browse hypertext documents, browse World Wide Web pages on the Internet and access interactive electronic technical manuals (IETMs).

39 Claims, 38 Drawing Sheets

U.S. PATENT DOCUMENTS

| | | | |
|---|---|---|---|
| 5,477,508 A | | 12/1995 | Will |
| 5,521,617 A | | 5/1996 | Imai et al. |
| 5,546,106 A | * | 8/1996 | Walgers ...................... 345/184 |
| 5,589,893 A | | 12/1996 | Gaughan et al. |
| 5,627,531 A | | 5/1997 | Posso et al. |
| 5,781,913 A | * | 7/1998 | Felsenstein et al. ........ 707/501 |
| 5,926,789 A | * | 7/1999 | Barbara et al. ............. 704/275 |
| 5,959,611 A | * | 9/1999 | Smailagic et al. .......... 345/156 |
| 5,963,195 A | * | 10/1999 | Gregg et al. ................ 345/159 |
| 5,963,966 A | * | 10/1999 | Mitchell et al. ............ 707/513 |
| 5,999,827 A | * | 12/1999 | Sudo et al. ................. 455/564 |
| 6,154,205 A | * | 11/2000 | Carrol et al. ............... 345/327 |
| 6,175,862 B1 | * | 1/2001 | Chen et al. ................. 709/218 |
| 6,192,258 B1 | * | 2/2001 | Kamada et al. ............. 455/566 |
| 6,211,878 B1 | * | 4/2001 | Cheng et al. ............... 345/357 |
| 6,138,129 A1 | * | 10/2001 | Combs ....................... 707/501 |

OTHER PUBLICATIONS

Asim Smailagic et al., "The VuMan 2 Wearable Cmputer", IEEE Design & Test of Computers, Sep., 1993.

A. Smailagic et al, "The Design and Implementation of the VuMan Wearable Computer", IEEE Design and Test of Computers, vol. 10, No. 5, 1993.

Bryce Cogswell et al., "Wearable Copmuters: Concepts and Examples", Papers and Sidebars submitted to the C.A.C.M. Special Issue on Ubiquitous Computing, Feb. 24–25, 1993: M.I.T.

* cited by examiner

PORTABLE COMPUTER SYSTEM WITH ERGONOMIC INPUT DEVICE

CROSS REFERENCE TO RELATED APPLICATIONS

This application is a continuation-in-part patent application of U.S. patent application Ser. No. 08/960,541 filed on Oct. 31, 1997 which is a continuation application of U.S. patent application Ser. No. 08/399,203 filed on Mar. 6, 1995, which is now abandoned.

STATEMENT REGARDING FEDERALLY SPONSORED RESEARCH OR DEVELOPMENT

This invention was made with support of the United States government under Contract No. DABT63-95-C0026 awarded by the Defense Advance Research Project Agency (DARPA). The United States government may have rights in this invention.

BACKGROUND OF THE INVENTION

1. Field of the Invention

The present invention relates generally to computers and input devices, and more specifically to a portable computer system having an ergonomic input device which is able to browse hypertext documents and World Wide Web pages on the Internet.

2. Description of the Invention Background

The convergence of a variety of technologies is preparing the next paradigm shift in information processing for the 1990's. Continued advances in semiconductor technology are producing high performance microprocessors requiring less power and less space. Decades of research in computer science have provided the technology for hands-off computing using speech and gesturing for input. Miniature heads-up displays weighing less than a few ounces combined with mobile communication technology make it possible for users to access information anywhere. It is even possible to sense a user's position such that the information can be superimposed upon the user's workspace.

Currently, wearable and other types of portable computers are all hampered by the need for the user to be able to input information or commands in an ergonomic and convenient manner. The use of a full size keyboard cancels many of the benefits gained by having a small portable or wearable computer. The provision of a keyboard also assumes that the user of the computer, perhaps a maintenance worker, will be capable of using the keyboard in an efficient manner. A mouse input device overcomes the problems associated with a keyboard, but the use of a mouse becomes impractical in confined areas where there is no flat surface on which to operate the device. Track balls alleviate that problem, but many people find such devices difficult to operate. Furthermore, the delicate mechanism of a track ball would quickly become inoperative in a manufacturing or maintenance environment where workers' hands are often heavily soiled. Voice input is hampered by the difficulties inherent in enabling computers to understand the spoken word. Thus the need exists for a rugged, ergonomic, inexpensive, input device that can be used with a portable computer system to allow the full benefits of the portable computer system to be realized.

SUMMARY OF THE PRESENT INVENTION

The present invention is directed to a portable computer system with an ergonomic input device that is rugged, easy to use, and inexpensive. The computer system is comprised of a housing having a top surface. A central processing unit is carried in the housing. A heads-up display is provided for displaying information to a user, with certain of the information being selectable by the user. The display is under the control of the central processing unit. A first rotary switch produces a first input signal for identifying the information to be selected. A second input switch produces a second input signal for selecting the identified information. Both the first and second input switches are carried on the top surface of the housing. An input interface receives the first and second input signals and inputs the information contained in those signals to the central processing unit.

In one embodiment, the housing may be carried in a case which is worn by the user while the heads-up display is positioned proximate to the user's eye by a headband. The present invention thus provides a wearable computer with hands-off access to text, images, maps, and other information needed to provide various operations and services. The ergonomic input device is easy to learn and operates in an intuitive manner. The computer system may be used as a maintenance assistant and advisor. The computer system may be implemented using low cost components in a design which minimizes power consumption.

In another embodiment, the portable computer system of the present invention may further comprise a third input device which allows the user to select the identified information appearing on the display by speaking.

The present invention further provides for the portable computer system of the present invention to be used to browse hypertext documents and World Wide Web pages on the Internet, wherein the displayed information which is selectable by the user are hypertext links. Those and other advantages and benefits of the present invention will become apparent from the description of the present invention hereinbelow.

BRIEF DESCRIPTION OF THE DRAWINGS

For the present invention to be readily understood and practiced, preferred embodiments will be described in conjunction with the following figures wherein.

DETAILED DESCRIPTION OF THE INVENTION

Figure 1:
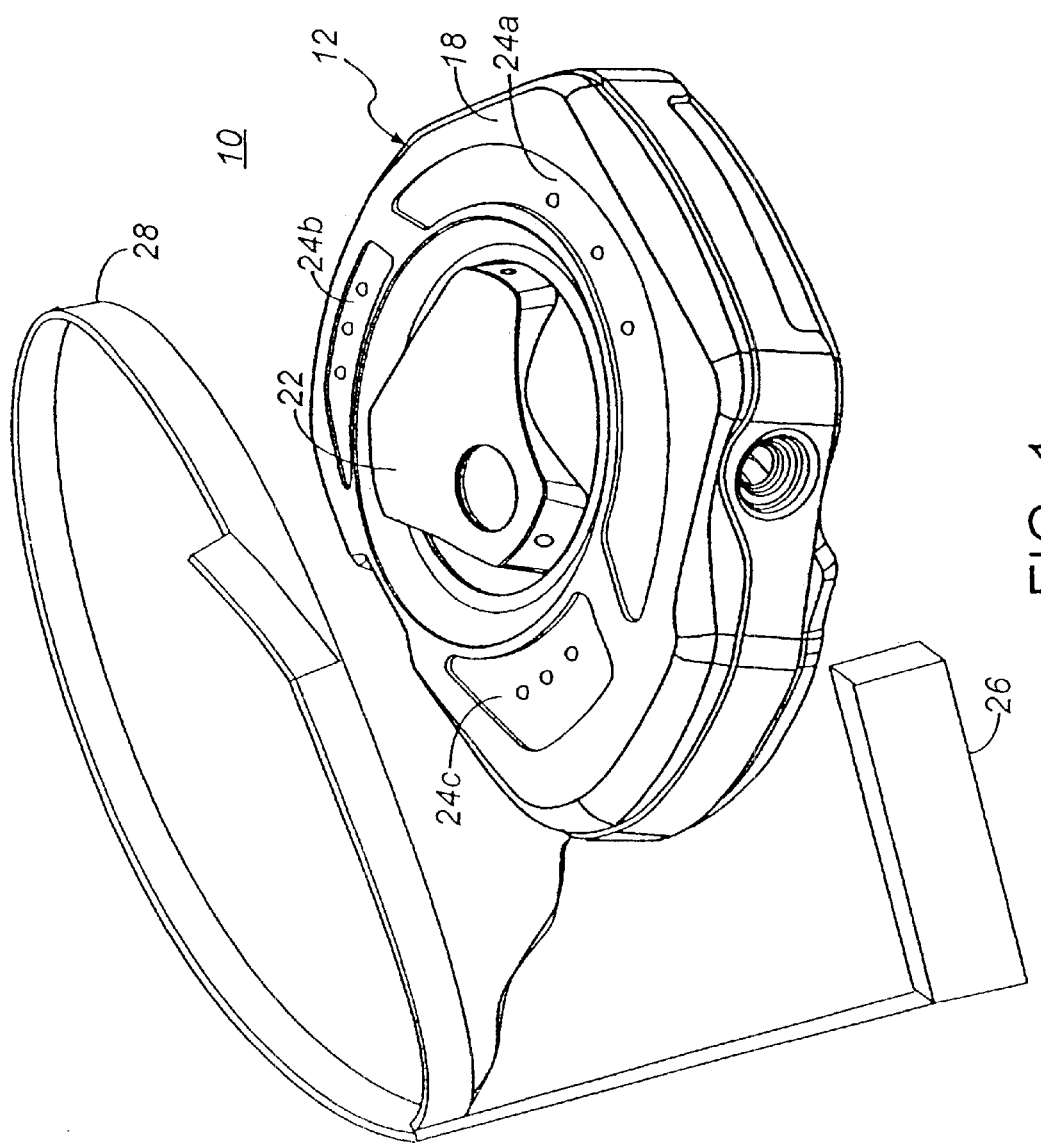
FIG. 1 is a perspective view of a portable computer system with an ergonomic input device constructed according to the teachings of the present invention.
Figure 2:
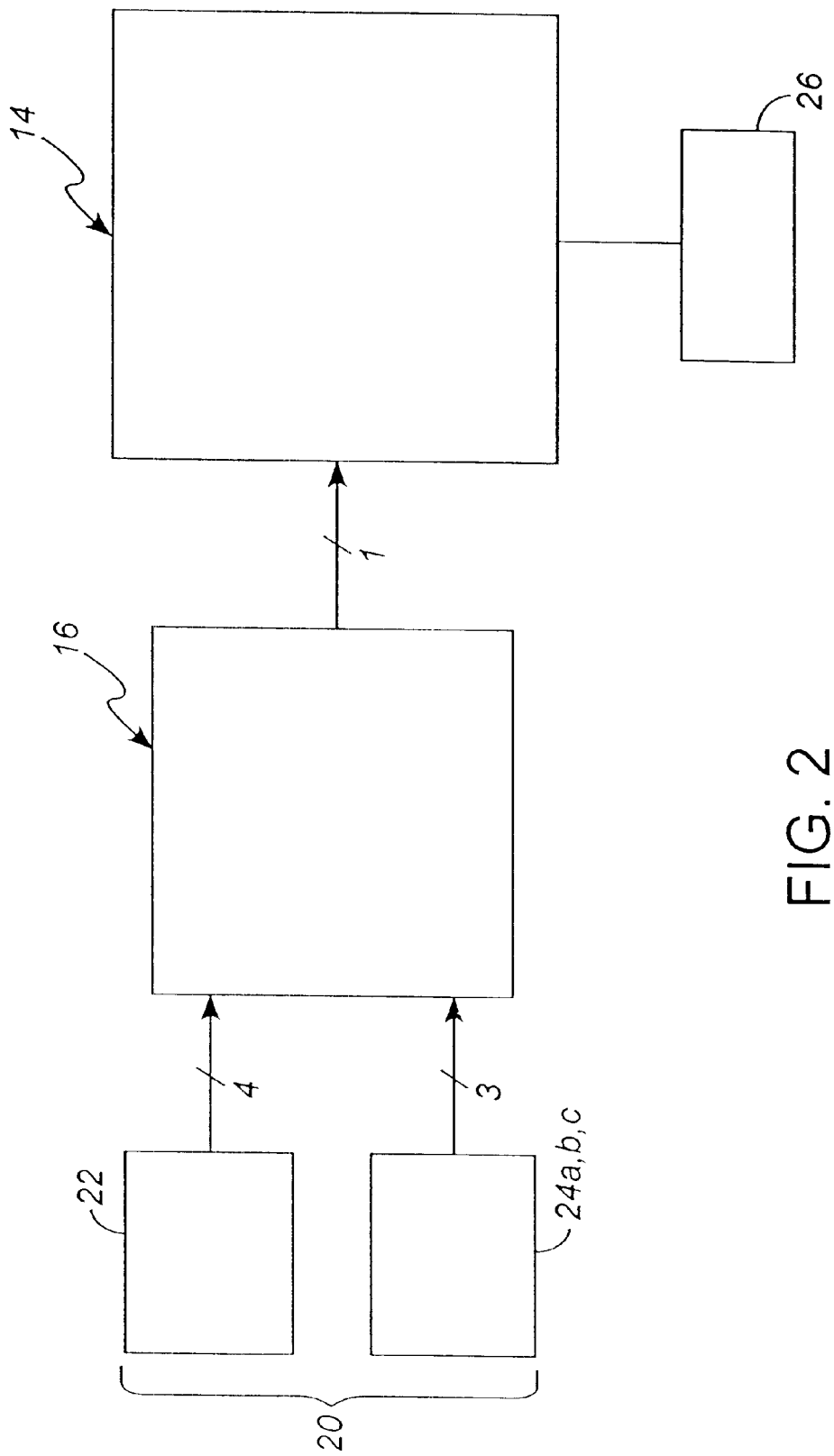
FIG. 2 is a high level block diagram of the electronics of the portable computer system shown in FIG. 1.
Figure 6:
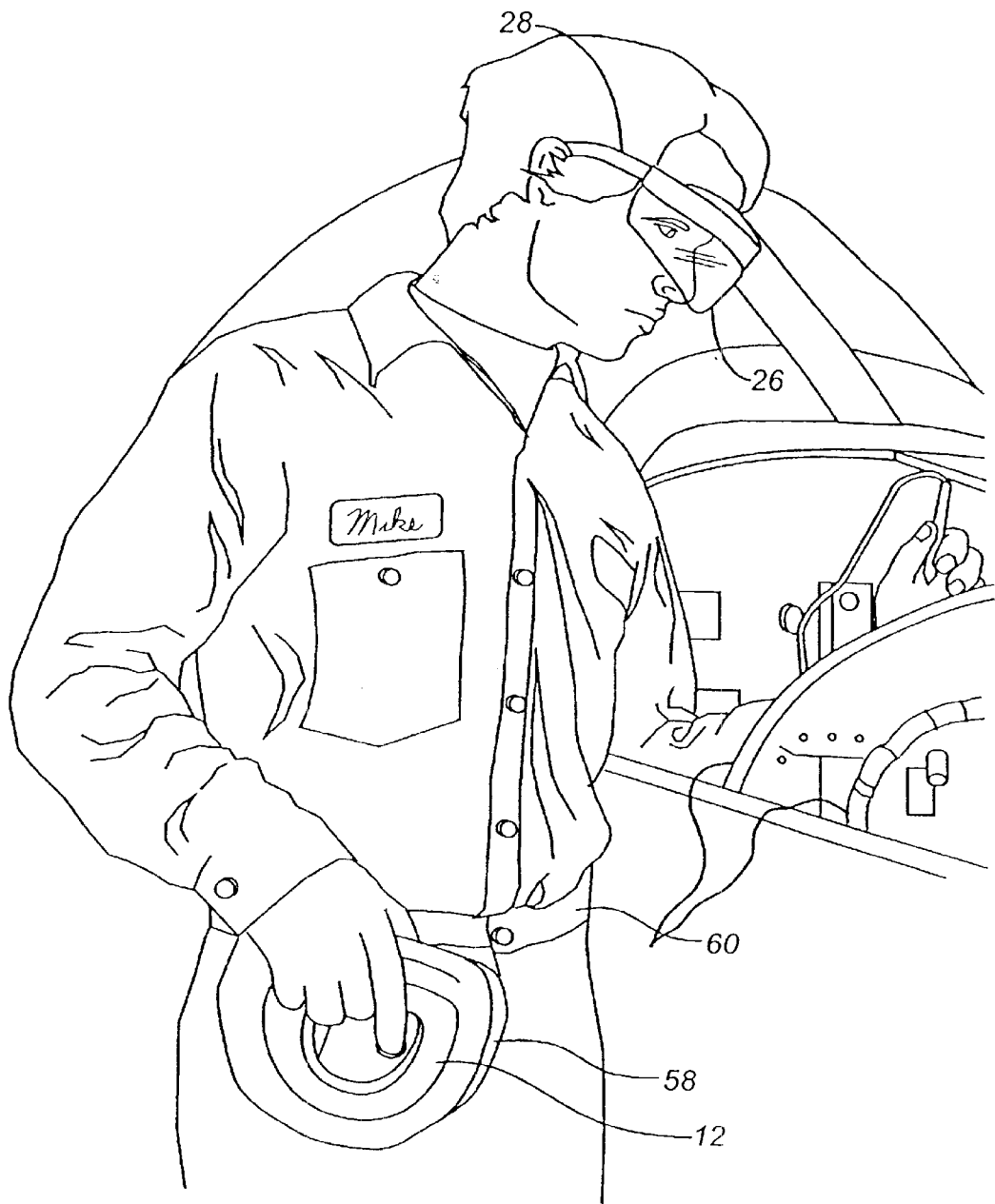
FIG. 6 illustrates the computer system of the present invention in use in a maintenance setting.

A portable computer system with an ergonomic input device constructed according to the teachings of the present invention is illustrated in a perspective view in FIG. 1 and as a block diagram in FIG. 2. The computer system 10 is comprised of a housing 12 which carries a central processing unit (CPU) 14 and an input interface 16. The housing 12 also has a top surface 18 which carries an ergonomic input device 20. The ergonomic input device 20 is comprised of a rotary switch or dial 22 and on/off switches 24a, 24b, and 24c. The computer system 10 is additionally comprised of a heads-up display 26 of a known type. The display is under the control of the CPU 14 and may be carried by a belt or headband 28 which may be an adjustable type of headband worn by the user so that display 26 may be positioned proximate to the user's eye. (See FIG. 6.)

The rotary switch 22 may be a 16 position, binary coded, rotary switch, which outputs a four-digit grey code representing the switch's position. A grey code is a special binary encoding scheme where adjacent numbers or positions have codes that differ in only one bit position. That prevents invalid readings should the position of the rotary switch 22 be sampled during a transition. The switches 24a, 24b and 24c may be momentary pushbutton switches positioned so as to surround the rotary switch 22.

Figure 3:
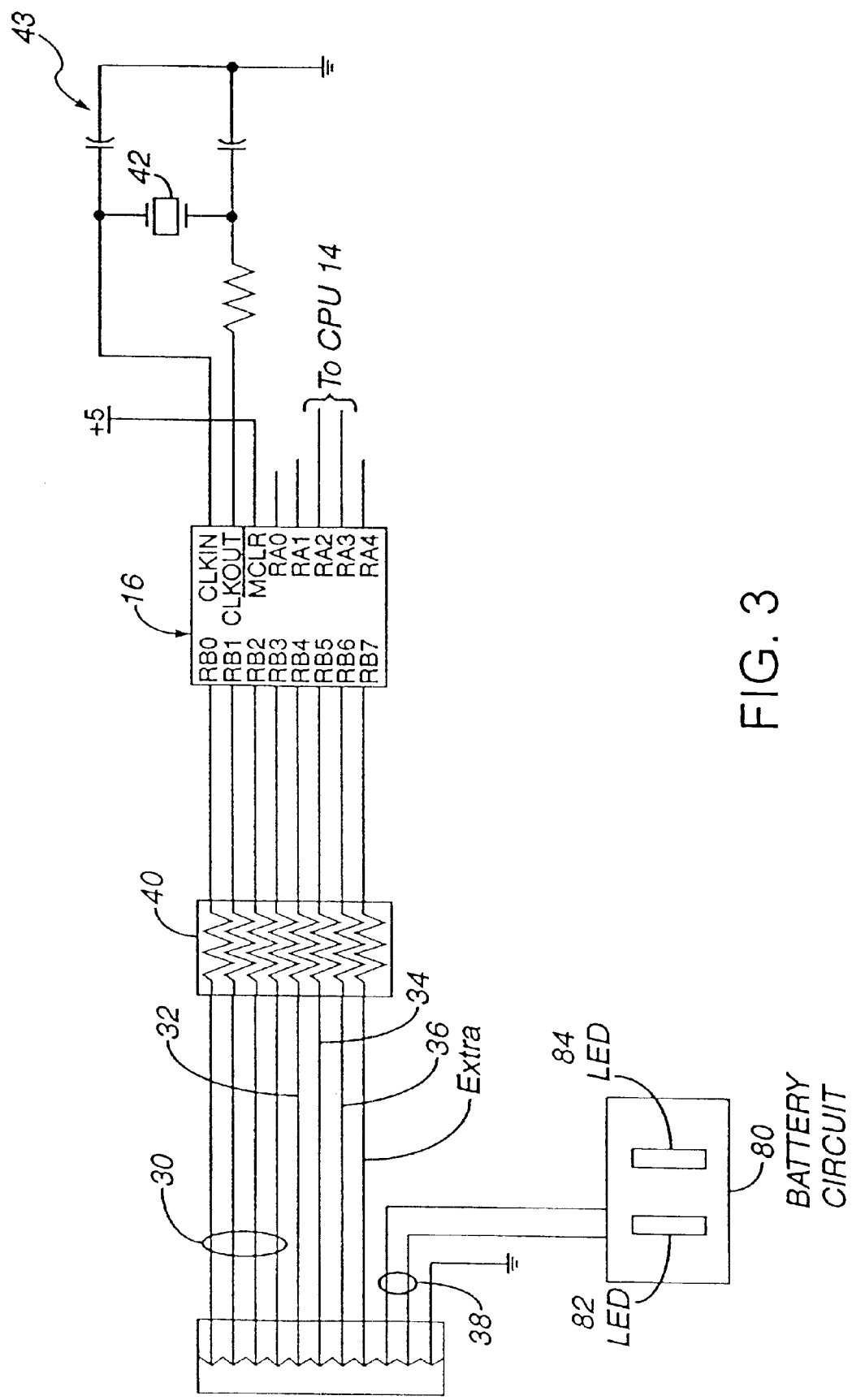
FIG. 3 is an electrical schematic of the input interface of the block diagram of FIG. 2.

Turning to FIG. 3, an electrical schematic of the input interface 16 is illustrated. The input interface translates the movement of the rotary switch 22 and the depressions of the switches 24a, 24b and 24c into data in a form that the CPU 14 can accept. In FIG. 3, four conductors 30 carry a first input signal produced by the rotary switch 22. The first input signal preferable sequentially identifies the information on the screen that is selectable. Conductors 32, 34 and 36 carry signals produced by switches 24a, 24b and 24c, respectively, which signals are used to select an identified piece of information. A pair of conductors 38 may be connected to a circuit 80 of known construction which indicates battery life. A green LED 82 is lit when battery voltage is acceptable and a red LED 84 flashes when battery voltage is low.

The group of conductors 30, and the individual conductors 32, 34, and 36 are input through a resistive bank 40 into input interface 16. The input interface 16 may be implemented using a PIC16LC71 microcontroller from Microchip Technology, Inc. Such a microcontroller may be programmed to accept the first and second input signals and encode the information contained therein into, for example, an eight bit byte of the type described hereinbelow. The eight bit byte contains the user input which is then transmitted to the CPU 14 through a serial port.

The PIC microcontroller was chosen for a number of reasons. First, one of the important characteristics of the computer system 10 is power consumption. The PIC microcontroller has a sleep mode. That mode halts the oscillator and puts the microcontroller in a special low-power mode which draws less than one micro-amp of current. The built-in watchdog timer can be preprogrammed to wake the PIC microcontroller from the sleep mode after a predetermined amount of time. The PIC microcontroller is the only part of the system that is connected to power, because the pull-up resistors (not shown) for the rotary switch 22 and push-button switches 24a, 24b, and 24c are contained within the PIC microcontroller and can be turned on and off at will. Because the PIC microcontroller is programmed to spend most of its time sleeping, there is very low power consumption.

Second, the PIC microcontroller contains most of the necessary circuitry on board. The only electrical components necessary, aside from the microcontroller, are the rotary switch 22, push-button switches 24a, 24b and 24c, the resistor bank 40, a 2.0 MHz crystal 42 and associated components needed to form an oscillator 43. As a result, the ergonomic input device 20 and input interface 16 are very small, which is of great importance in the field of portable or wearable computers.

User input may be transmitted to the CPU 14 as one byte for every switch 24a, 24b and 24c depression or every turn of rotary switch 22. The data byte consists of six significant bits. Bits 5 and 6 represent the rotary switch turning clockwise and counterclockwise, respectively. If one of those bits is set to one, then the bits 0 through 4 represent the grey code input signal. If both of those bits are set to zero, then bits 0 through 4 represent four possible switches (of which only three are currently used). If any of bits 0 through 4 is set to 1, then the corresponding switch was just depressed. It is possible for more than one bit to be set in a data byte, if a user presses two switches at the same time, for example. However, a byte is transmitted only when a switch is depressed or the dial is turned. That allows the software to set an interrupt on the serial port to which the PIC microcontroller is connected, and use the interrupt handler to monitor user input.

Currently, the PIC microcontroller runs at 2.0 MHz, and transmits data at 9600 baud. All of that is, of course, programmable as are the transmission codes and events causing a transmission. For example, the interface 16 could be programmed to transmit keyboard scan codes or ASCII characters. Codes can be transmitted when switches are released as well as pressed, or based on the rotary switch's current position instead of its movement. The input connector has provision for eight input lines. That could be used for one 16-position dial and four button switches, two dials and eight button switches, or some combination of dials, buttons, and other devices, simply by reprogramming the PIC microcontroller.

Figure 4:
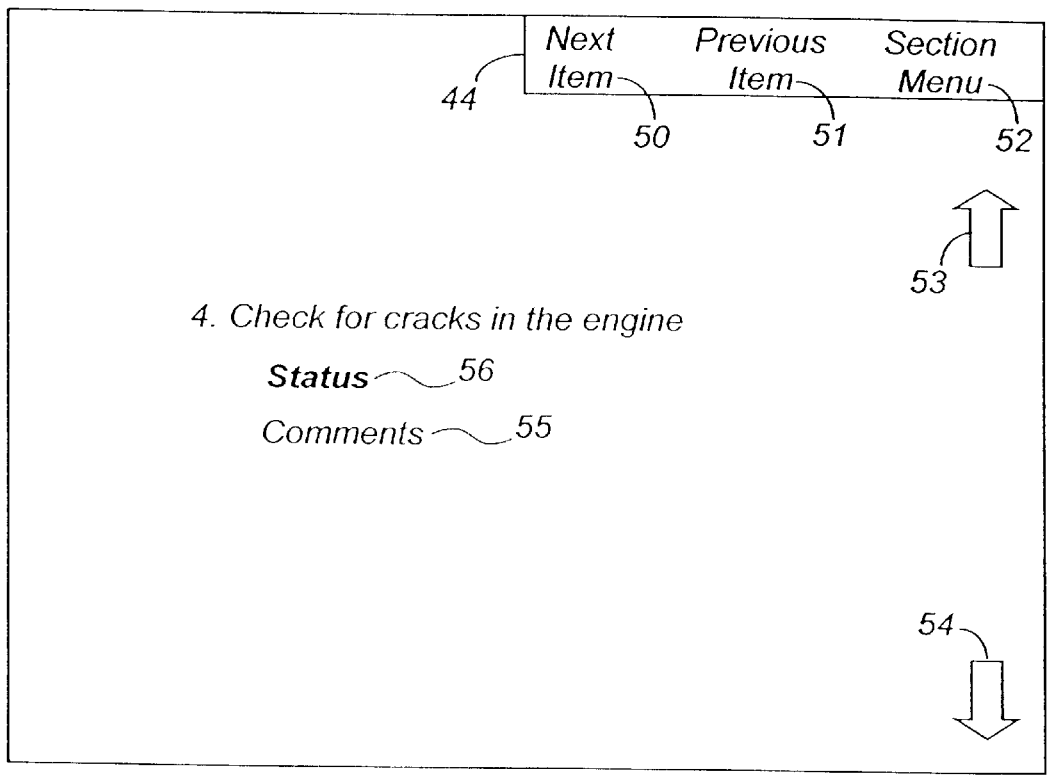
FIG. 4 illustrates a sample screen.

In FIG. 4, a sample screen is illustrated which may be visible in display 26. The screen illustrates a command window 44 which has options identified as "Next Item" 50, "Previous Item" 51, and "Section Menu" 52. The screen also displays text, with two options possible under the text identified as "Status" 56 and "Comments" 55. Two arrows are also illustrated on the screen identified as 53 and 54 to enable the user to scroll up or down, respectively. As is known, a particular portion of the screen can be selected to perform an action. Such zones are recognizable by their boldness, as shown by the word "Status" 56, or by a blinking cursor. Such zones are referred to as hot spots. The user can move through the hot spots 50, 51, 52, 53, 54, 55, and 56 by rotating the rotary switch 22 in a clockwise direction. Rotation of the rotary switch 22 in a counterclockwise position causes the user to move through the hot spots in a reverse order. When the desired hot spot is identified as shown in bold, any one of the switches 24a, 24b or 24c may be depressed to select the identified hot spot.

Figure 5:
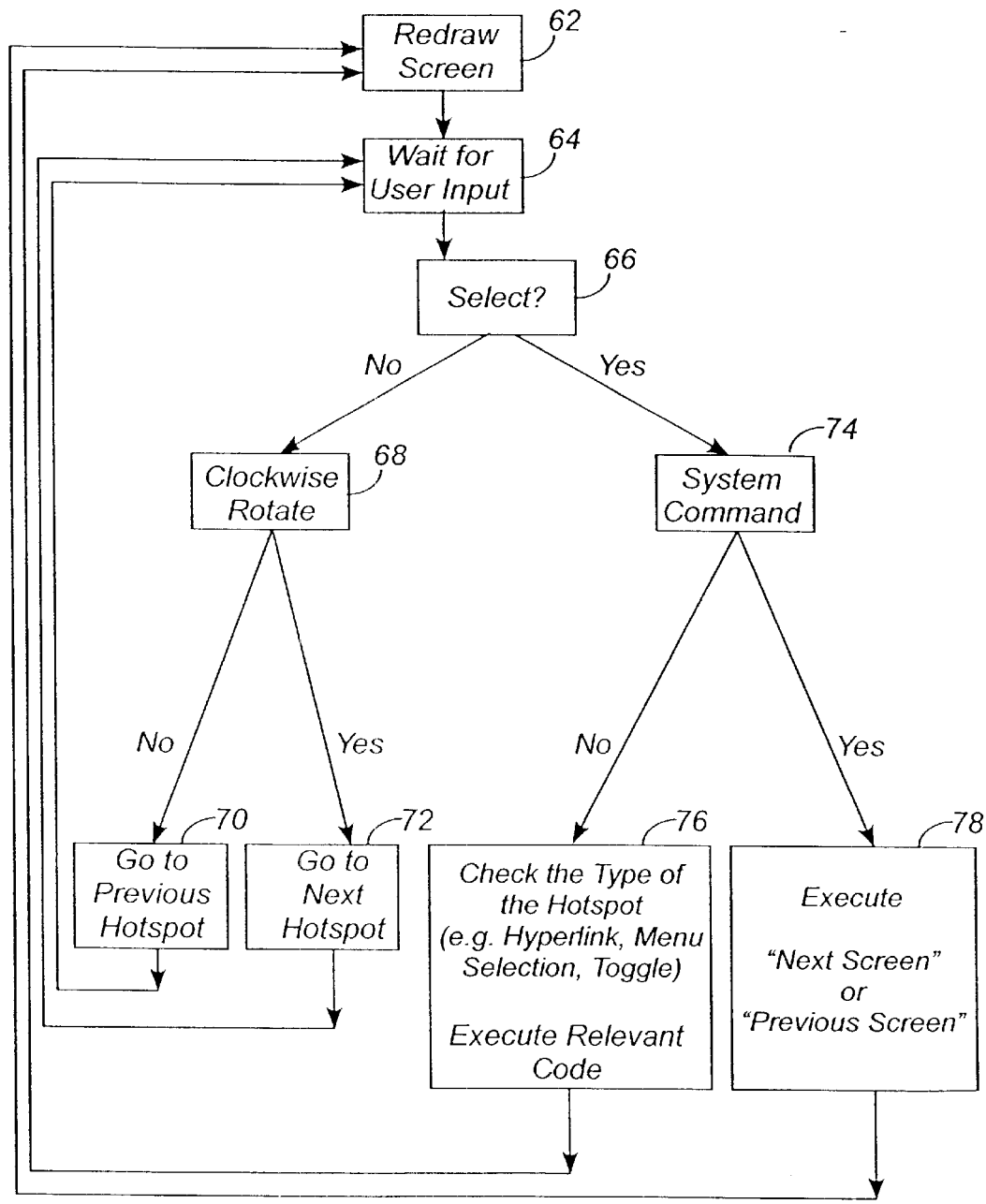
FIG. 5 is a flow chart illustrating the relationship between the operation of the ergonomic input device of the present invention and the position of a hot spot on a display.

A block diagram illustrating the operation of the software which controls the interaction between the ergonomic input device 20 and the control of the hot spot on the display 26 is illustrated in FIG. 5. In FIG. 5, a screen is drawn or redrawn at step 62. Thereafter, process control proceeds to step 64 in which the software awaits input from the user, i.e., the eight bit byte of information provided to the CPU 14 from the input interface 16. When input is received from the user, step 66 determines if a selection has been made, i.e. whether one of the switches 24a, 24b or 24c has been depressed. If none of the switches has been depressed, then the input must be rotation of the rotary switch 22 and process control proceeds with step 68. At step 68, a determination is made if the switch 22 has been rotated clockwise. If so, process control proceeds with step 72 wherein the next hot spot becomes the active hot spot. If the rotary switch has been rotated counterclockwise, process control proceeds with step 70 in which the previous hot spot becomes the current hot spot. After either step 70 or 72, process control returns to step 64 to await additional user input.

If at the select step 66 a selection was made, process control proceeds with step 74 to determine if a system command had been invoked. If not, the type of hot spot is checked at step 76, the relevant code is executed, and the screen is redrawn at step 62. If, on the other hand, a system command is invoked at step 74, at step 78 an execution of the next screen or previous screen, as appropriate, is performed and the appropriate screen is redrawn at step 62. Thereafter, process control returns to step 64 to await additional user input. In that manner, the rotation of the rotary switch 22 coupled with operation of the push-button switches 24a, 24b and 24c controls the hot spot and ultimately controls the information displayed on the display 26. Those of ordinary skill in the art will recognize that the flow chart illustrated in FIG. 5 can be implemented in software in a variety of ways.

We have found that the rotary switch 22 is a very convenient input device for a range of applications such as where the user is wearing gloves, performing maintenance or manufacturing in a confined environment, in areas with dirt, fuel, corrosive chemicals, etc.

Although the input device 20 of the present invention may be used to control the hot spot with any type of document displayed on the display 26, use of rotary switch 22 and push-button switches 24a, 24b, and 24c is particularly advantageous for browsing through a hypertext document. The hypertext links may be specified by the hypertext document author. Whenever the user selects a hypertext link, which is represented as a hot spot, the relevant hypertext page will be shown on the screen. The computer system 10 of the present invention can provide an extremely large volume of information to the user such that it becomes a tool in the user's environment much like pencils or reference books. The computer system 10 can provide automatic, portable, convenient access to extremely large volumes of information. As a result, the following applications are envisioned.

Self-guiding navigation—Through position sensing, the computer system 10 can help a user maneuver in a strange location by superimposing information on a see-through display precisely in the direction the user is looking at the moment of inquiry.

See-through reality for manufacturing—Construction engineers for such diverse industries as aircraft, buildings, chemical plants, and shipbuilding have large, oversized blueprints that frequently have to be referenced during the construction process. The computer system 10 would allow this information to be carried by the construction worker to the point of application, thereby increasing efficiency and decreasing errors.

Maintenance—As systems become more reliable and more complex, maintenance and repair become increasingly challenging problems. The computer system 10 superimposes maintenance information upon the actual artifact, can use highlighting and animation to identify components, and the procedures necessary to replace them.

Medical—Large medical databases are still centrally located, making access to information time-consuming. The computer system 10 would allow a physician to call up multi-media information ranging from textual diagnosis and graphs of vital signs to x-rays while treating the patient.

Returning to FIG. 1, the housing 12 may be designed to withstand shock, temperature, water, and dirt. A link may be provided between the CPU 14 and a main computer (not shown) so that results from inspection checklists, manufacturing checklists, etc. can be uploaded for scheduling and planning. The CPU 14 may be used in conjunction with another board controlling memory cards or other devices such as a transmitter/receiver in a modular fashion. By providing a carrying case 58 of the type shown in FIG. 6, together with a belt 60, the computer system 10 can be conveniently used in maintenance, manufacturing, and other settings.

Figure 7:
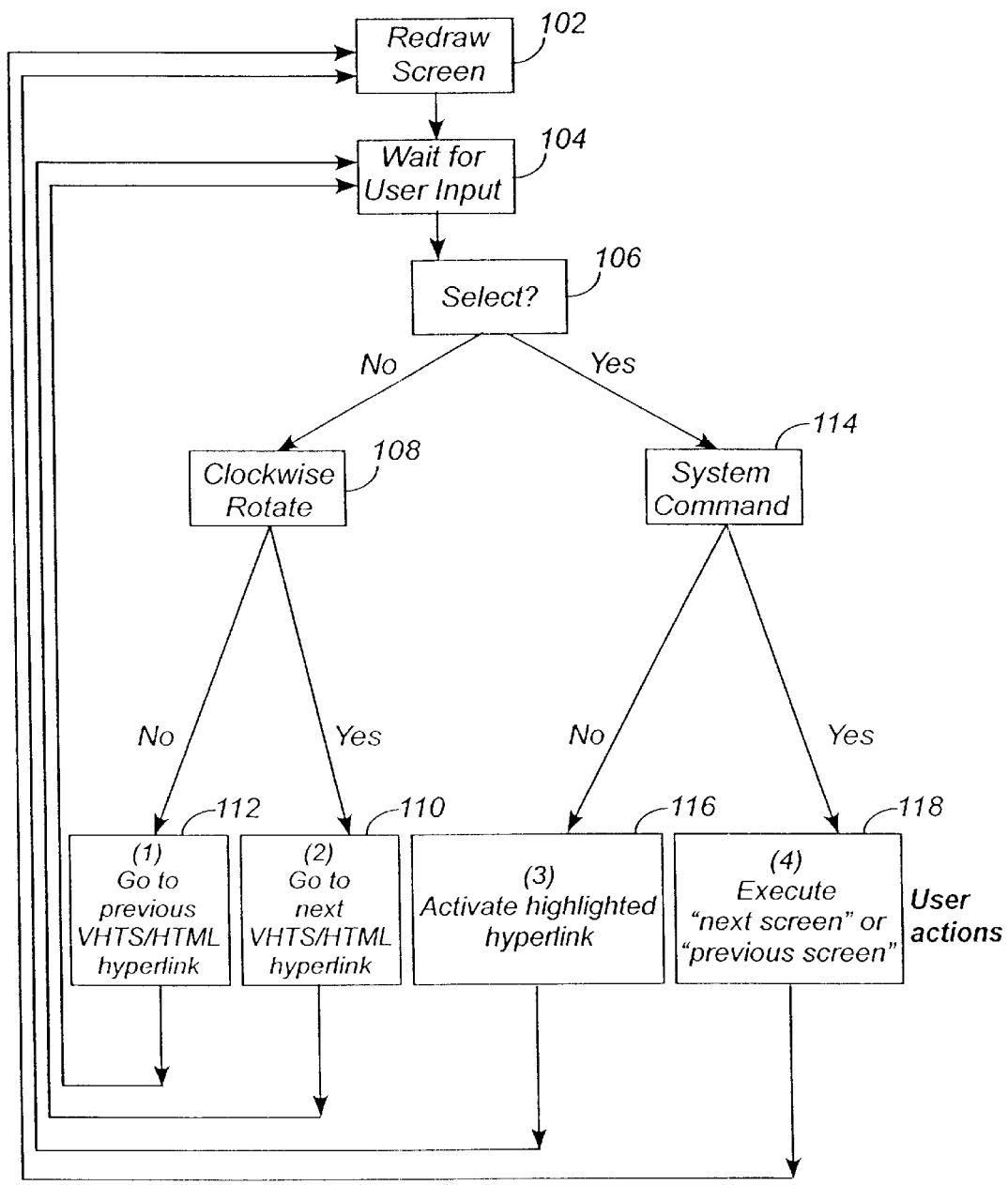
FIG. 7 is a flow chart illustrating the relationship between the ergonomic input device of the present invention and the position of a hot spot on the display when the user is browsing hypertext links of World Wide Web pages on the Internet or hypertext links of interactive electronic manuals.
Figure 8:
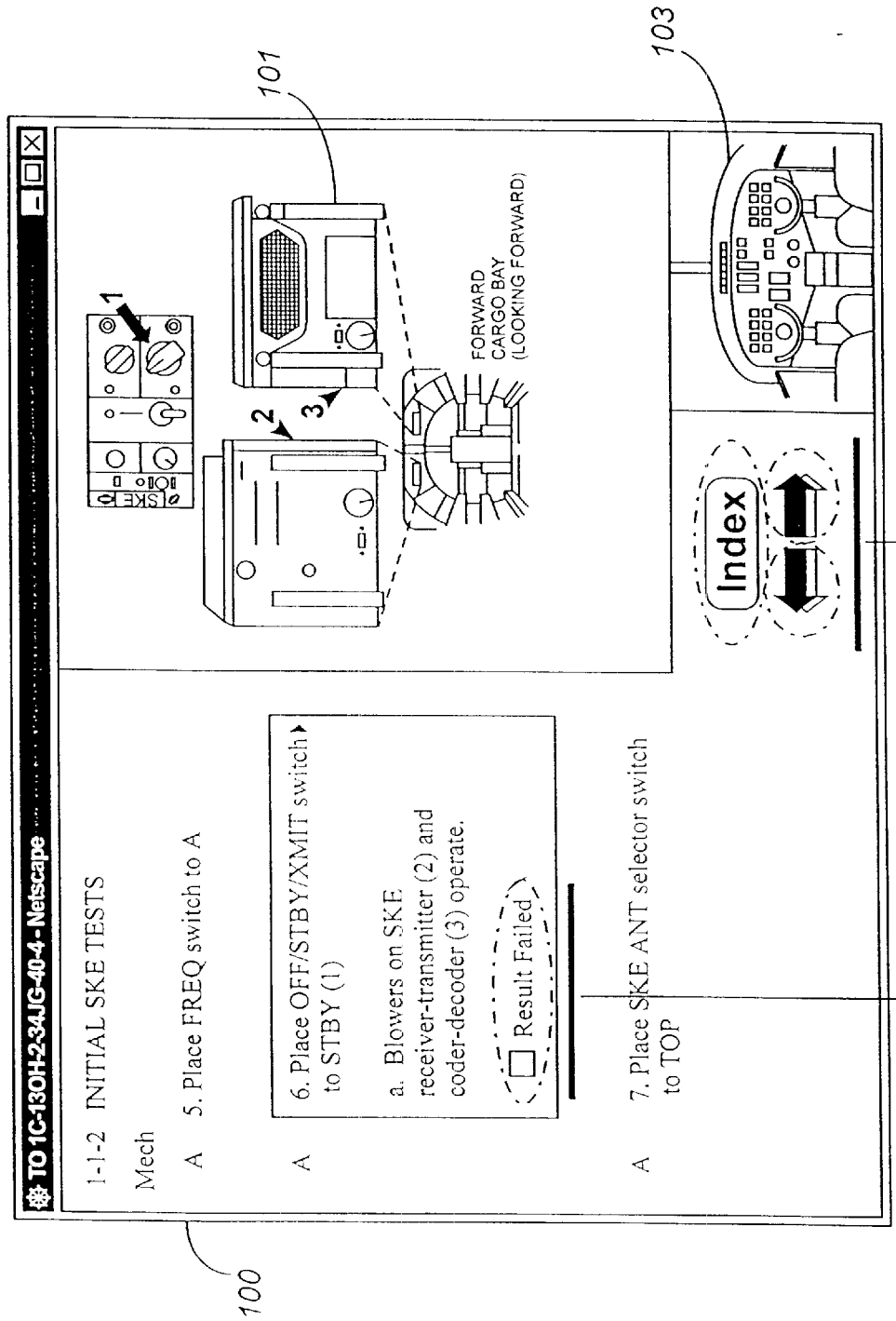
FIG. 8 is a sample screen of an interactive electronic technical manual (IETM) system.

The portable computer of the present invention can be used to navigate hypertext link documents in general, hypertext link documents which form an interactive electronic technical manual, and hypertext links of World Wide Web pages on the Internet. FIG. 7 is a flowchart illustrating the operation of the present invention when the user is browsing the hypertext links of the World Wide Web, or hypertext links of an interactive electronic training manual (IETM). FIG. 8 is a screen of the IETM for a C-130 aircraft. A multimedia collaboration system with head-mounted display, video camera, and wireless communications provides access to electronic maintenance manuals and remote access to a human help desk expert on the C-130 aircraft. This embodiment of the present invention was designed to use collaboration to facilitate training. As illustrated in FIG. 8, the left side of the screen 100 is a portion of the maintenance checklist and the right side thereof is a "whiteboard" having a schematic 101 and video image 103 that both can be manipulated by the trainers. Inexperienced users are being trained to perform a cockpit inspection and the trainers were located in the more spacious cargo hold of the C-130. The trainee loads the inspection procedures and performs the inspection. A desktop system managed the normal job order process and was used by the instructors in this embodiment of the present invention to observe the trainee's behavior. The instructor looks over the shoulder (through a small video camera attached to the top of the trainee's head mounted display) and advises when problems occur. The advice includes an instructor-controlled cursor screen of trainee's head mounted display for indicating areas on the schematic 101 and video image 103. The trainee's use of the whiteboard is limited to observation. The wearable unit has two main functions: navigating through the checklist and initiating collaboration. All navigational links are either through the natural sequence of the checklist or through a simple menu. The trainee uses a dial to sequence through active regions of the screen.

The screen shown in FIG. 8 illustrates an example of the user interface that supports a checklist application. The interface is organized as a hierarchy with a sequential list of inspection steps embedded in the hierarchy. Each screen gives the ability to go to the next or previous step of the inspection. Failures can be indicated within the instructions. The interface is organized as a hierarchy with a sequential list of inspection steps embedded in the hierarchy. Each screen gives the ability to go to the next or previous step of the inspection. Failures can be indicated within the instructions.

Collaboration is managed by the remote expert from a workstation. A collaboration consists of the trainee verbally stating something about a problem and the expert indicating with the cursor and describing verbally the actions to be taken. Since the expert is at a desktop, moving a cursor to any position on the field of view is not a problem.

The C-130 application software was constructed using World Wide Web (WWW) browsers and took advantage of the hypertext linking facility supported by that software. Special helper applications were written in Java to provide collaborative drawing services. The database component consisted of a collection of databases both newly created and preexisting. The C-130 project had databases that contained checklist information. The middleware included a WWW server that provided interfaces to the databases and generation of HTML with the information from the databases included. The middleware also included the communication aspects of the collaboration software. The electronics provided sufficient resources so that a full function operating system (Windows 95) could be used on the wearable platform. The database and middleware components of the software were resident on the desktop.

Netscape's Communicator was used for the C-130 project because it allowed easy integration with the dial input device; however, Microsoft's Internet Explorer may also be used. Netscape's Communicator allows Tab and Shift-Tab as mechanisms for navigating through the links on a page. A clockwise rotation of the dial was mapped into the Tab and counterclockwise into the Shift-Tab, and consequently, the browser could be used without modification. In this case, it was the software that constrained the electronics to be sufficiently powerful to support a fully functional operating system that in turn, supported the WWW software. For this application, the input device as shown in FIG. 1 was adapted so that a dial provided all of the necessary input capability except for the video camera and associated video capture card.

The entire input device system including batteries weighs less than three pounds and can be mission-configured for sparse and no communications infrastructures. A spread-spectrum radio and small electronic disk drive provide communications and storage in the case of sparse communications infrastructure, whereas a large disk drive provides self-contained stand-alone operation when there is no communication infrastructure. A full duplex sound chip supports speech recognition. The very sophisticated housing includes an embedded joypad as an alternative input device to speech.

Referring to FIGS. 7 and 8, a screen 100 (shown in FIG. 8) is drawn or redrawn at step 102. Thereafter, process control proceeds to step 104 in which the software awaits input from the user (i.e., the 8 bit byte of information provided to the CPU 14 from the input interface 16). Referring to the screen shown in FIG. 8, this step will correspond to the user deciding whether or not he or she would like to select the highlighted hot spot, which in this case is titled "Result Failed". If the user does not select this hot spot, then the input must be rotation of the rotary switch 22 and process control proceeds with step 108. At step 108, a determination is made if the switch has been rotated clockwise. If so, process control proceeds with step 110, wherein the next hot spot becomes the active hot spot. If the rotary switch has been rotated counterclockwise, process control proceeds with step 112 in which case the previous hot spot becomes the current hot spot. After either step 110 or 112, process control returns to step 102 and proceeds to step 104 to await additional user input. Referring to FIG. 8, if the user rotates the rotary switch in the clockwise direction, and thus proceeds to step 110, the hot spot moves from "Result Failed" to the next hot spot, "Index". However, if the user rotates the rotary switch 22 in a counterclockwise rotation and thus elects step 112, the current hot spot is changed from "Result Failed" to the previous hot spot which is one of the arrows in the lower right portion of the screen.

If, however, at step 106, a selection was made by pressing one of the switches 24*a*, 24*b*, 24*c*, process control proceeds with step 114 to determine if a system command (i.e., a command that causes a new page to be displayed on the screen) has been invoked. If not, the highlighted hyperlink is activated at step 116, the routing code is executed, and the screen is redrawn at step 102. For example, referring to FIG. 8, if the "Results Failed" link is selected and one of the switches 24*a*, 24*b*, or 24*c* is depressed, thus choosing the "Result Failed" hypertext link, an indication mark is provided in the box (See FIG. 13). If, on the other hand, a system command is invoked at step 114, at step 118 an execution of the next screen or previous screen, as appropriate is performed and an appropriate new screen is drawn at step 102. Thereafter, process control returns to step 104 to await additional user input. In that manner, the rotation of the rotary switch 22 coupled with operations of the push button switches 24*a*, 24*b*, 24*c* controls the hot spots and ultimately controls the information displayed on the display 26.

Figure 9:
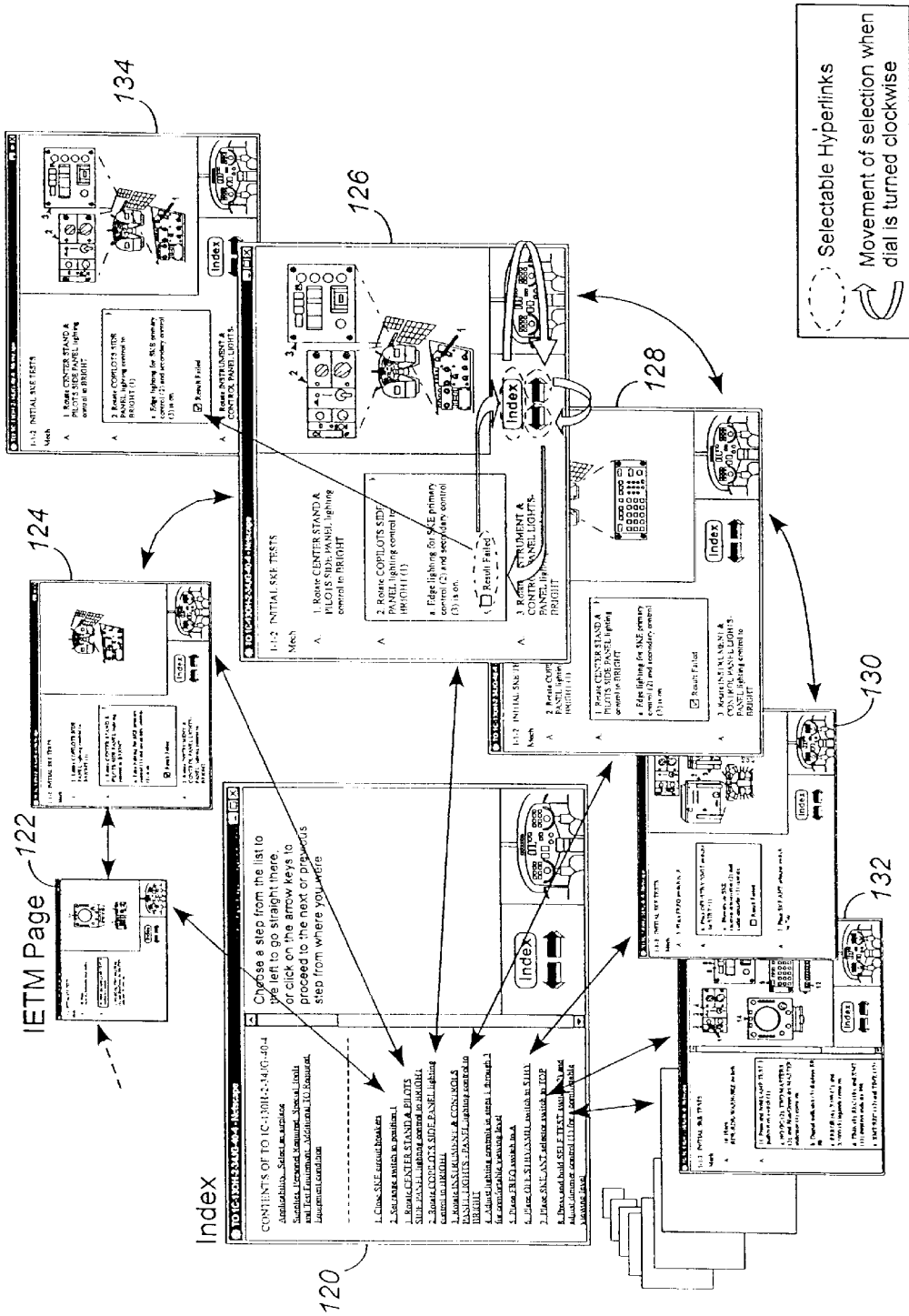
FIG. 9 illustrates the organization of the screens of the IETM system.
Figure 10:
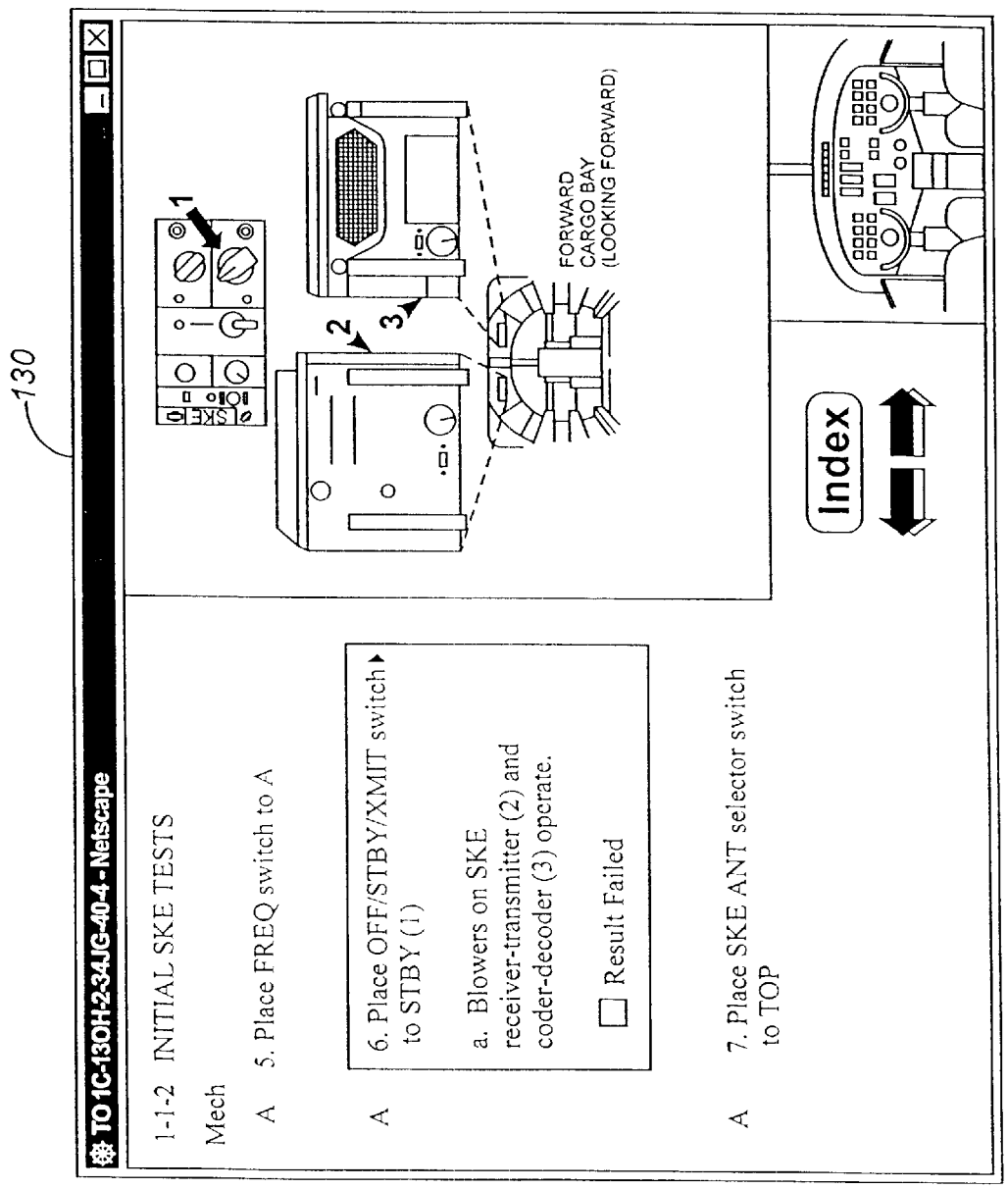
FIGS. 10 through 14 illustrate enlarged views of the screens of the IETM system shown in FIG. 9.
Figure 11:
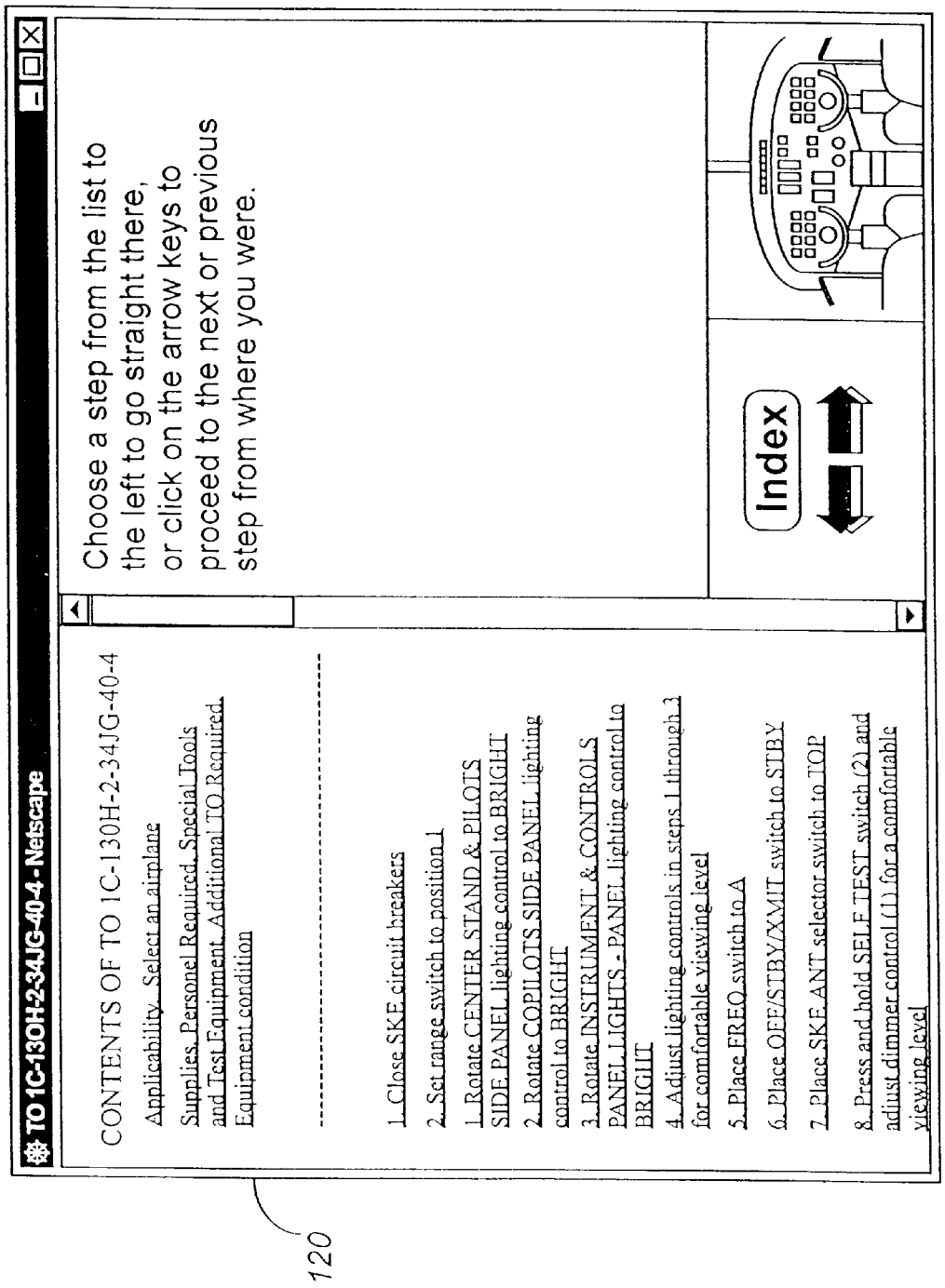
Figure 12:
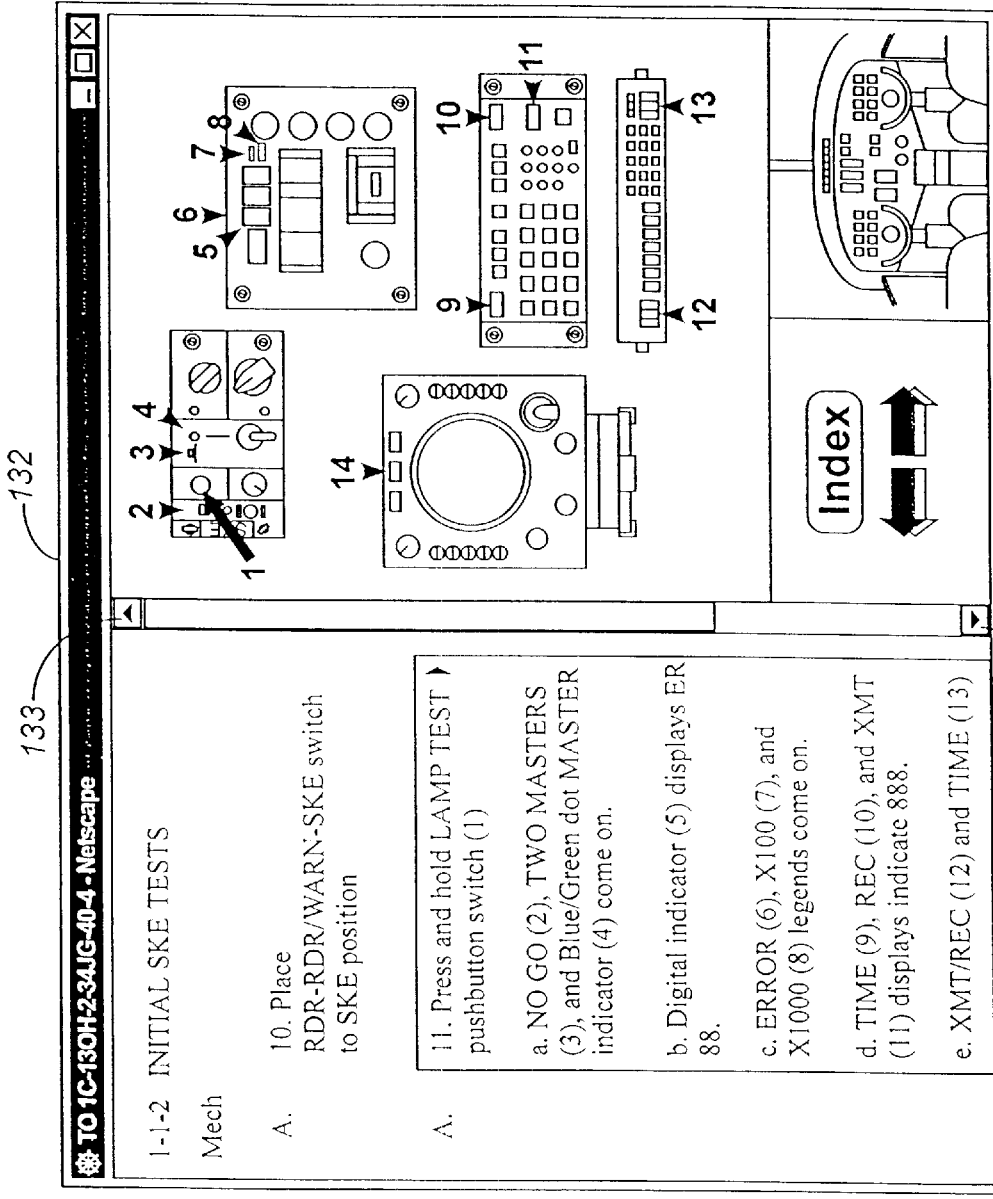
Figure 13:
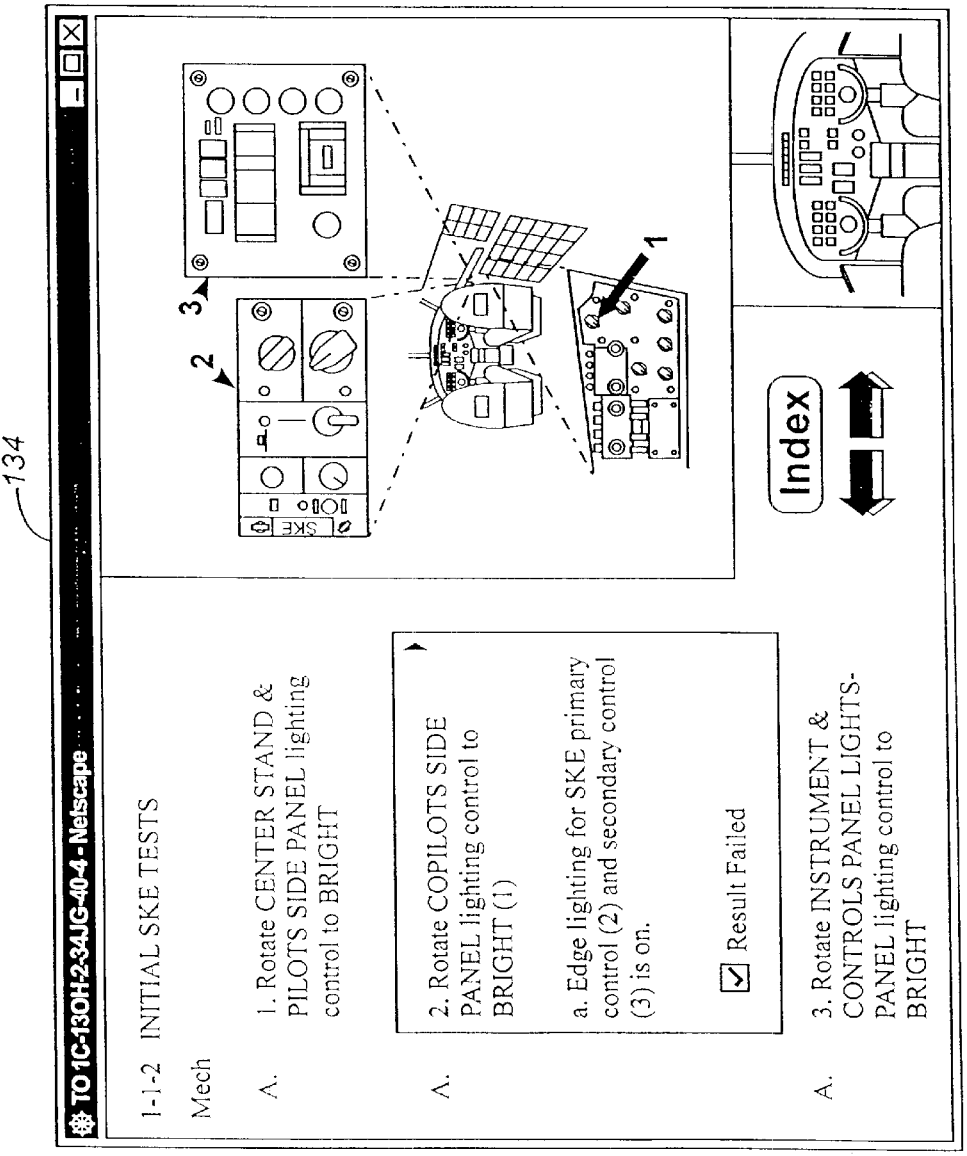
Figure 14:
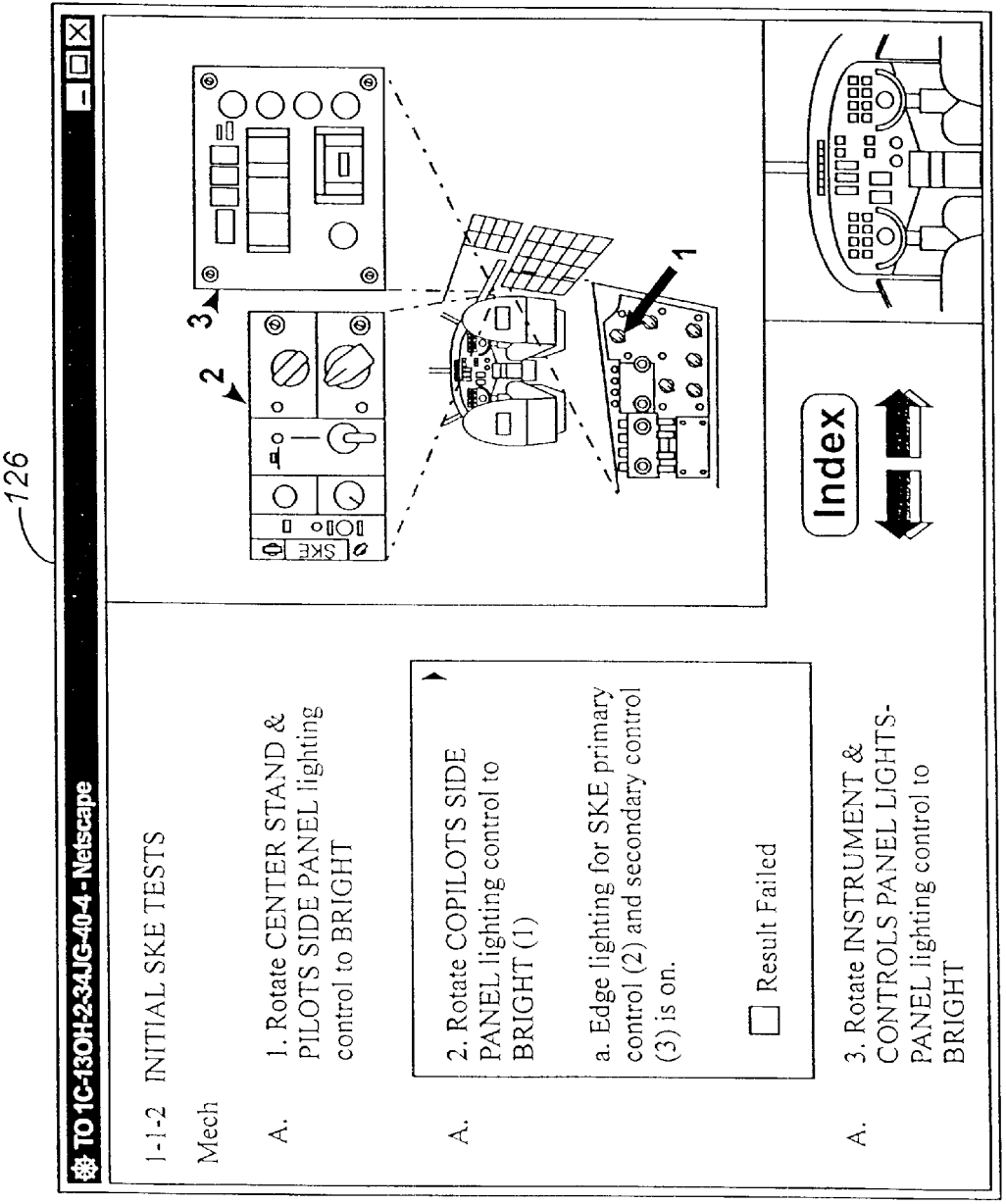

FIG. 9 illustrates the organization and hyperlinks between some of the many screens of the IETM system. FIGS. 10–14 illustrate enlarged views of the screens of the IETM system shown in FIG. 9. Some of the selectable hot spots are indicated by broken lines in the form of a circle and some of the hyperlinks are illustrated with arrows. FIG. 9 includes a screen of the "Index" 120, shown in greater detail in FIG. 11. The "Index" screen includes a checklist of steps of the maintenance procedure. Each of the steps listed corresponds to a screen 122, 124, 126, 128, 130, and 132. Screen 130 is illustrated in FIG. 10; screen 132 is illustrated in FIG. 12;

screen 134 is illustrated in FIG. 13; and screen 126 is illustrated in FIG. 14. Referring to FIGS. 9 and 10, when the user, during the maintenance procedure, comes to the item in the checklist that states "Rotate Copilot Side Panel Lighting Control To Bright," the user could select this entry by depressing one of the switches 24a, 24b or 24c which would result in process control reading the hyperlink text which would direct the computer to screen 126 (FIG. 14) and display the screen 126 on the display 26. Screen 126 includes a schematic as well as a photograph of the copilot side panel used to indicate where on the side panel the user would have to conduct this maintenance operation. For instance, the lighting control, the primary control and the secondary control are indicated by reference numerals 1, 2 and 3 on the schematic on screen 126. If the operation failed, the user would indicate this by a system command using one of the switches 24a, 24b and 24c. This command is shown on screen 134 in FIG. 13. As indicated above, this information could be downloaded to a main computer. Once that step of the maintenance test is done, the user could rotate the rotary switch to the hypertext link labeled "Index" and go back to screen 120 by depressing one of the switches 24a, 24b or 24c. Alternatively, the user could rotate the rotary switch 22 clockwise to the arrows which represents "next screen" or "previous screen," respectively, and scroll to screen 128 or 124, respectively.

The user when positioned at screen 126 could also move forward through the screens by rotating the rotary switch 22 to the forward arrow and depressing one of the switches 24a, 24b or 24c on both screen 126 and screen 128 such that screen 130 would appear on the display 26. Screen 130 is illustrated in greater detail in FIG. 10. Screen 130 includes step 6 of the checklist which is "Place OFF/STBY/XMIT Switch To Standby (1)" as well as a schematic diagram of the forward cargo bay and a photograph of the cockpit. If the result is failure, the user can indicate this by rotating the cursor to the "Result Failed" hot spot on screen 130 and depressing one of switches 24a, 24b and 24c. The process control will then redraw the screen to include a check mark in the box next to the "Result Failed" hot spot. (See FIG. 13). After completing step 6, the user has the option of returning to screen 120 with the "Index" or moving to the previous or next screen. If the user chooses to return to the "Index," the user must rotate the rotary switch 22 such that the "Index" hot spot becomes the current hot spot and then depress one of the switches 24a, 24b, or 24c. Alternatively, if the user chooses to scroll to the previous screen 128 or the next screen 132, the user needs to scroll to the forward or backward arrow and depress one of the switches 24a, 24b or 24c.

FIG. 12 is an enlarged view of screen 132 which details another step of the maintenance test. As can be seen in FIG. 12, the instructions indicated by (a) through (e) are incomplete. In order to see the additional steps that follow step (e), the user must scroll down through the screen. The user scrolls down through the screen by rotating the cursor to the up and down arrows 133 and 135.

Figure 15:
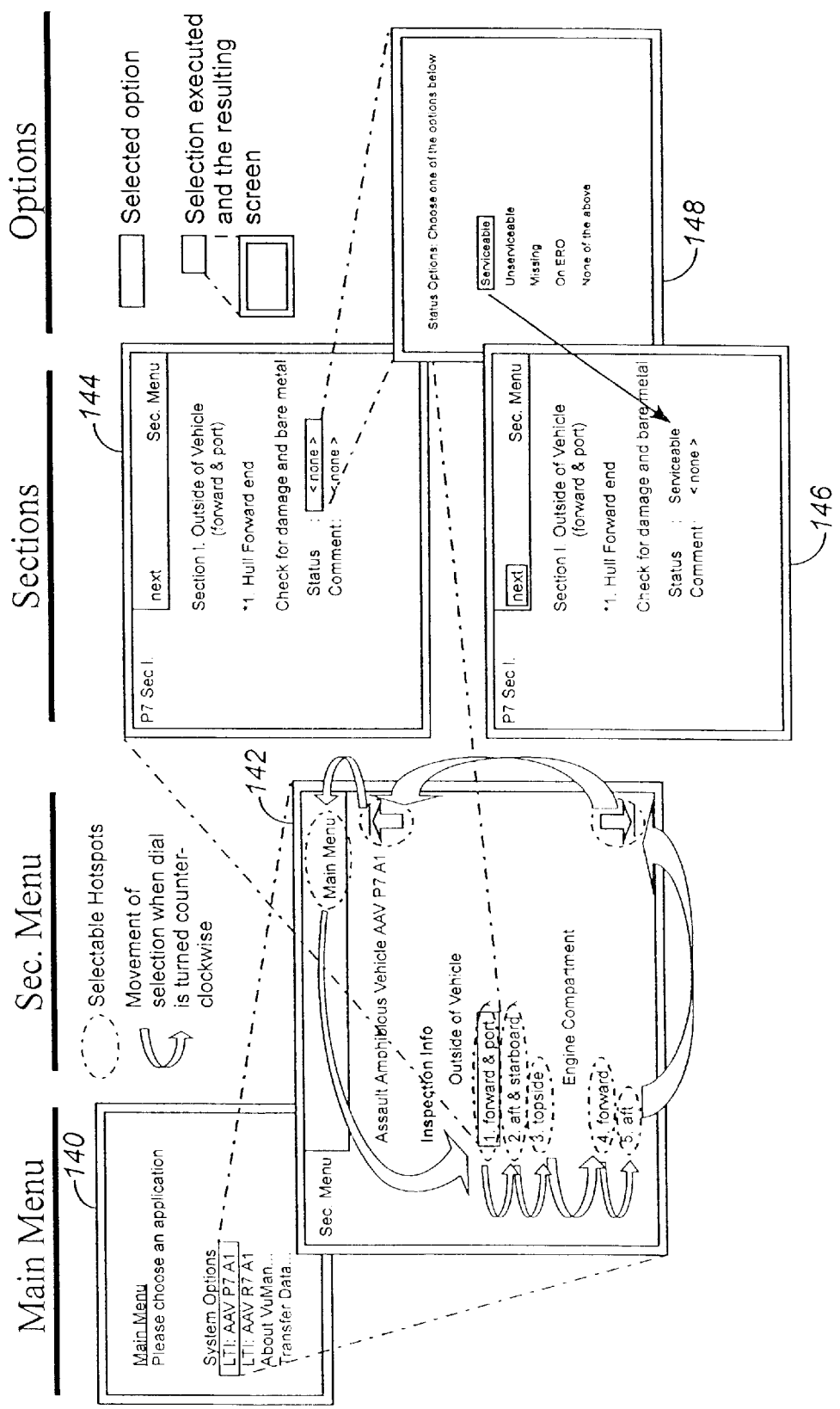
FIG. 15 illustrates various screens of a Limited Technical Inspection (LTI) system of amphibious vehicles, which includes hypertext links to World Wide Web pages on the Internet.
Figure 16:
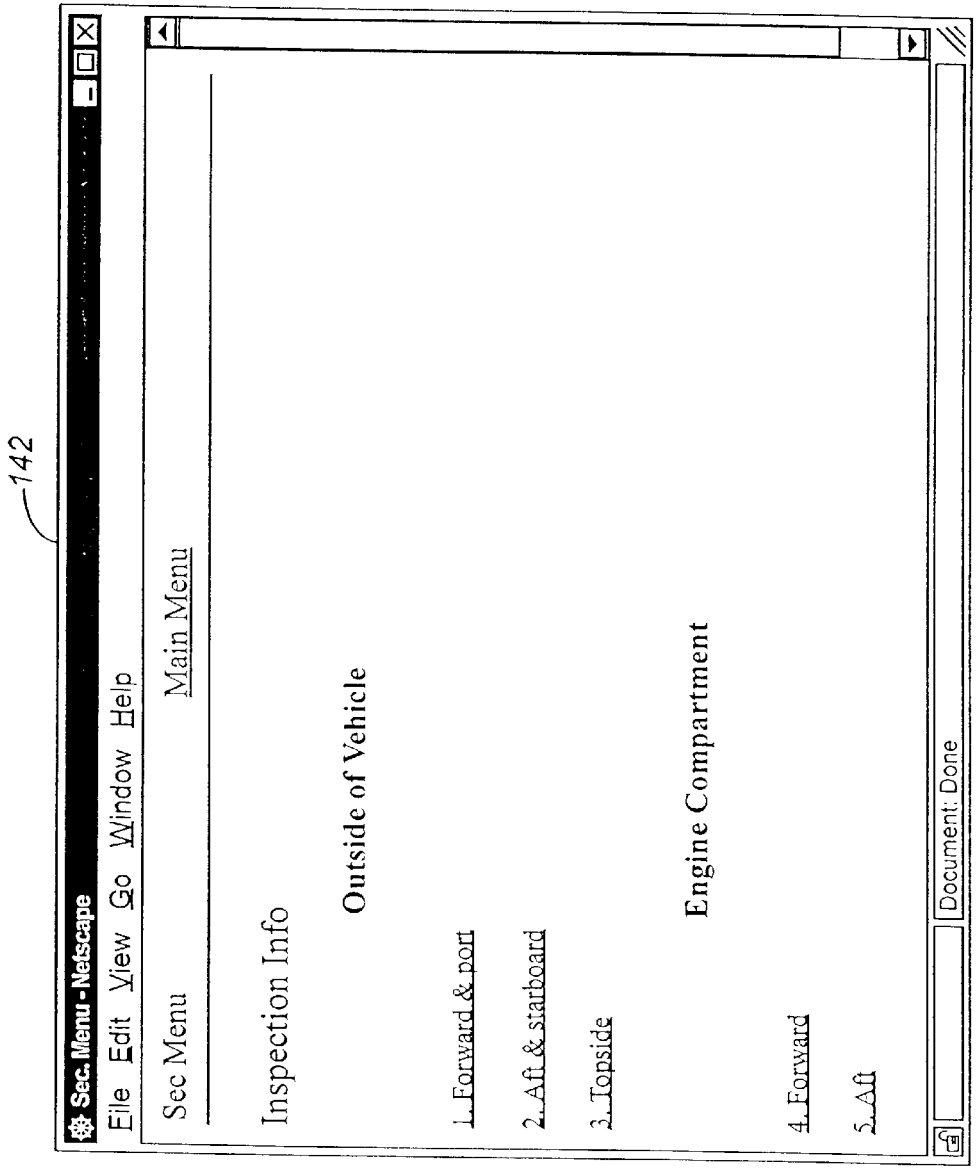
FIGS. 16–20 illustrate additional screens of the LTI system shown in FIG. 15.
Figure 17:
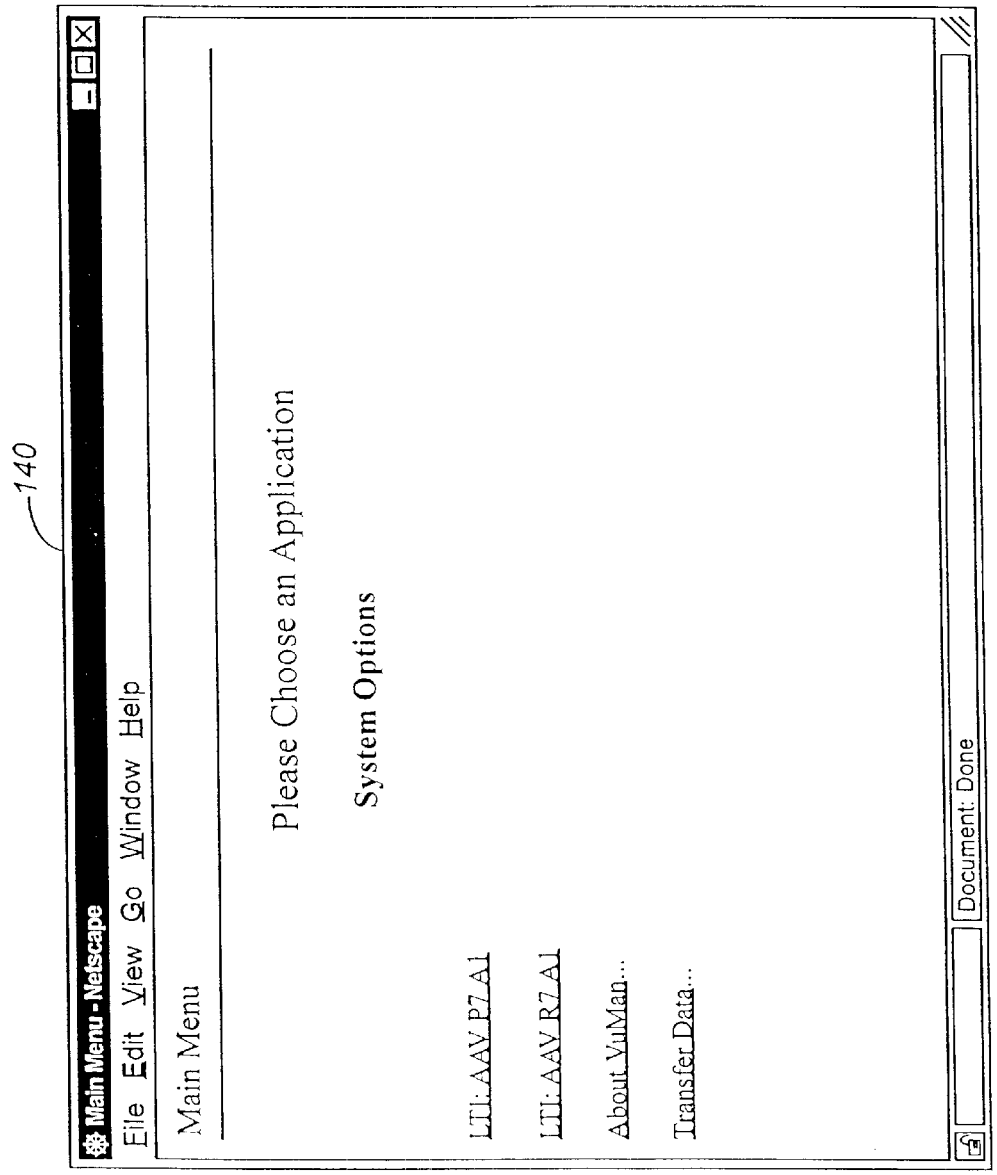
Figure 18:
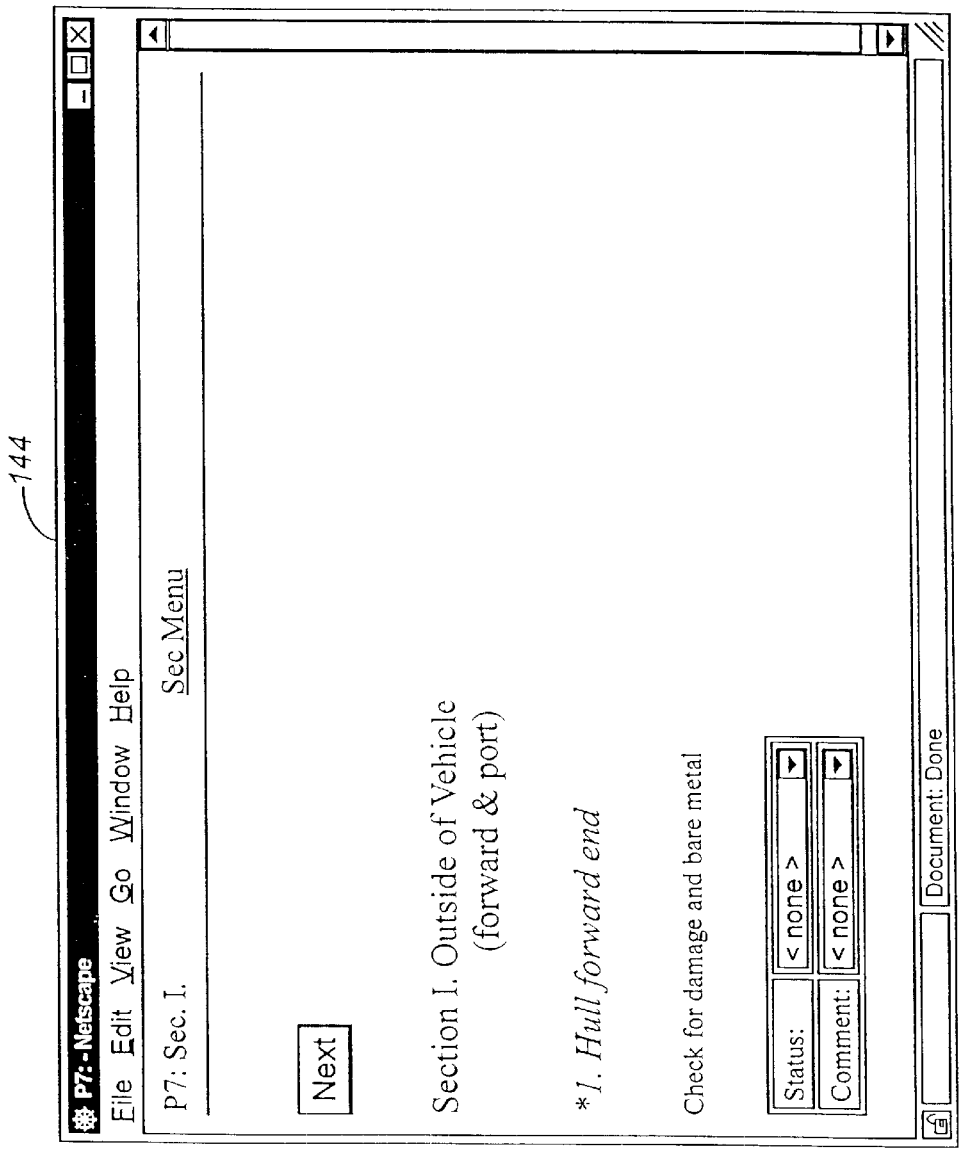

FIG. 15 illustrates various screens of the LTI system which includes hypertext links of the World Wide Web on the Internet. After accessing the web page for the LTI maintenance system of amphibious vehicles, the main menu screen 140, which is shown in greater detail in FIG. 17, will appear on the display 26 as described at step 102 (FIG. 7). The process control will then wait for input from the user at step 104. The user can scroll down through the system options and choose either the maintenance instructions for the AAV P7 A1 machinery or the maintenance instructions for the AAV R7 A1 machinery by using the rotary switch 22 and scrolling through the difference hot spots, as described above. If the user chooses the first of these options by depressing one of the switches 24a, 24b or 24c, screen 142, which is shown in greater detail in FIG. 16. The user will then choose between inspecting components on the outside of the vehicle or the engine compartment. If the user chooses to inspect the forward end port portion of the outside of the vehicle, the user will scroll down using the rotary switch 22 to the item labeled "forward & port" and depress one of the switches 24a, 24b or 24c and as a result screen 144, which is shown in greater detail in FIG. 18, will be displayed on a display 26.

Figure 19:
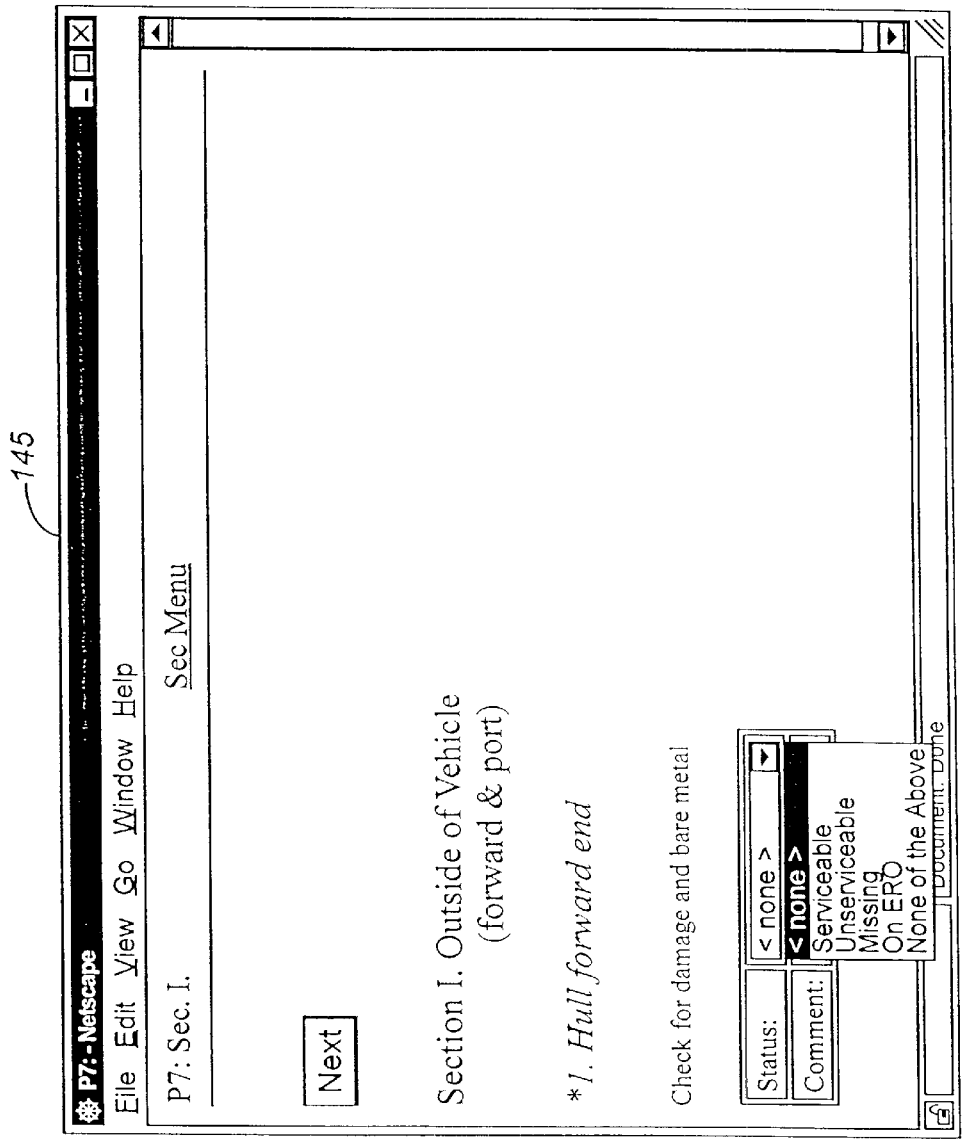
Figure 20:
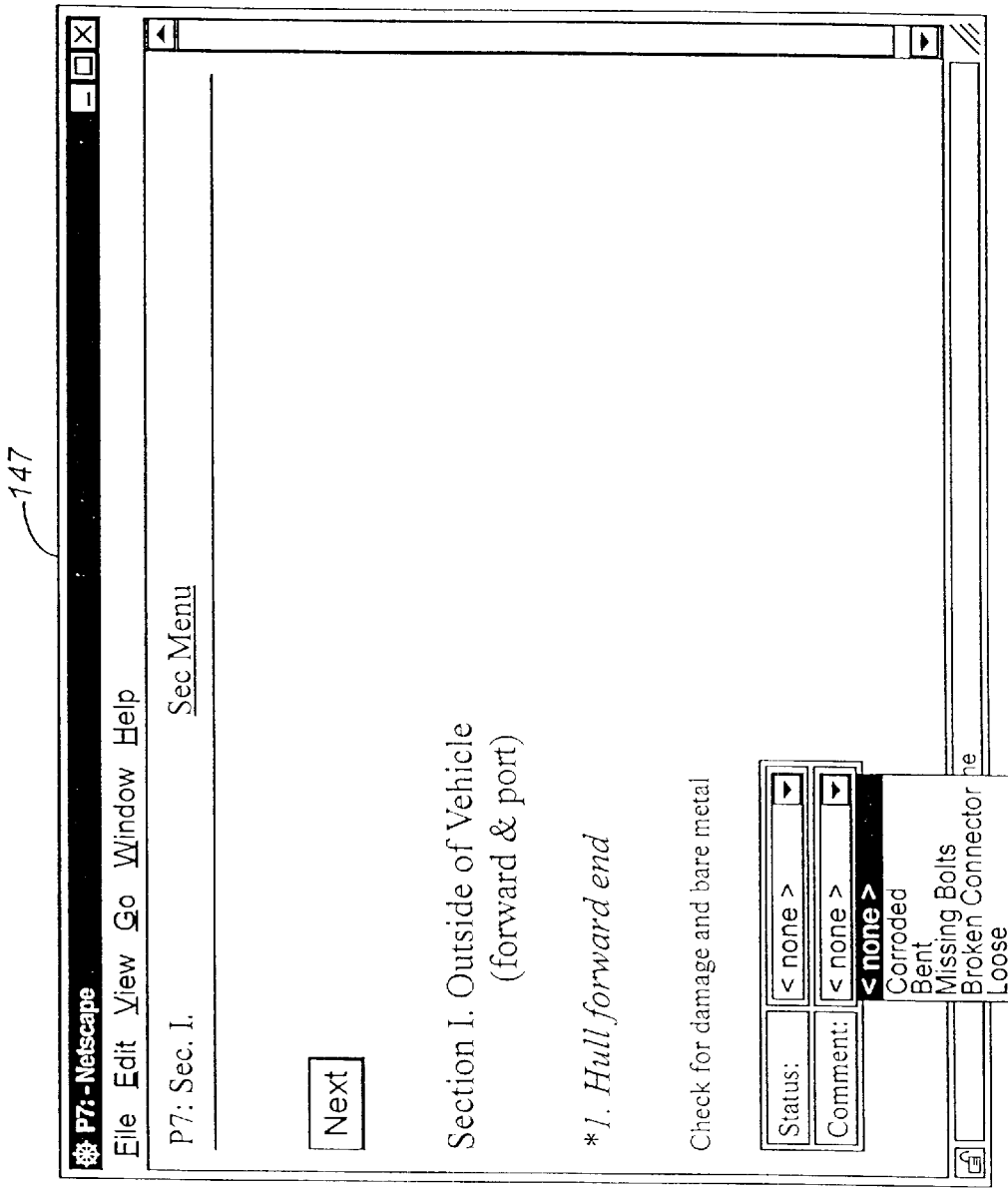

Screen 144 (FIG. 18) indicates that the user must "check for damage and bare metal." After the user has completed checking for damage and bare metal, the user can scroll down to the "status" portion of the screen by using the rotary switch 22 and by depressing one of the switches 24a, 24b or 24c, which will result in a menu bar being pulled down. The user can then scroll down the menu of options and choose one of the various options such as "serviceable", "unserviceable", "missing", "on ERO", or "none of the above", as shown in FIG. 19. By depressing one of the switches 24a, 24b or 24c, the user can then choose one of the comments which is appropriate to the specific piece of machinery. The user can then scroll down to the "comment" section of the menu and depress one of the switches 24a, 24b or 24c to pull down the menu bar and choose from a variety of comments such as "corroded", "bent" or "missing bolts", as shown in FIG. 20. By scrolling down using the rotary switch 22 and depressing one of the switches 24a, 24b or 24c, one of the comments will be entered in the comments screen. As stated above, the comment as well as the status entered in the respective screens can be downloaded to a main computer where the information can be stored. Depression of one or more buttons may perform the function specified by the highlighted option, enter the highlighted information into a database, provide auxiliary information, select a hyper-text link, and select an option on a World Wide Web page. This enables use of World Wide Web browsers and the hypertext linking facility supported by that software.

The connection between the wearable computer and external network is performed using wireless communication, namely Lucent's wireless Local Area Network (LAN) called WaveLAN. Like other wireless LANs, the Lucent's WaveLAN includes both "access points", called WavePOINT units, and host network adapters, called WaveLAN units. The WaveLAN host network adapter is available as a Type II PCMCIA PC Card with a small external radio and antenna unit. The WavePOINT access point is mounted in a fixed position and connected to a wired LAN via an Ethernet port, allowing the wearable computer to communicate with the wired LAN and Internet. Spread-spectrum techniques are used in these products, typically direct-sequence spread spectrum (DSSS) at 915 MHz or 2.4 GHz, or frequency hooping spread spectrum (FHSS) at 2.4 GHz or 5.7 GHz. WaveLAN is using DSSS. The spread spectrum radio is denoted by Radio in FIG. 23. The access point operates as a transparent medium access control (MAC)—level bridge to forward packets to and from the wired LAN as needed. WaveLAN is manufactured by Lucent Technologies Eastern Region, 5 Wood Hollow Road 3H25, Parsipanny, N.J. 07054.

Figure 21:
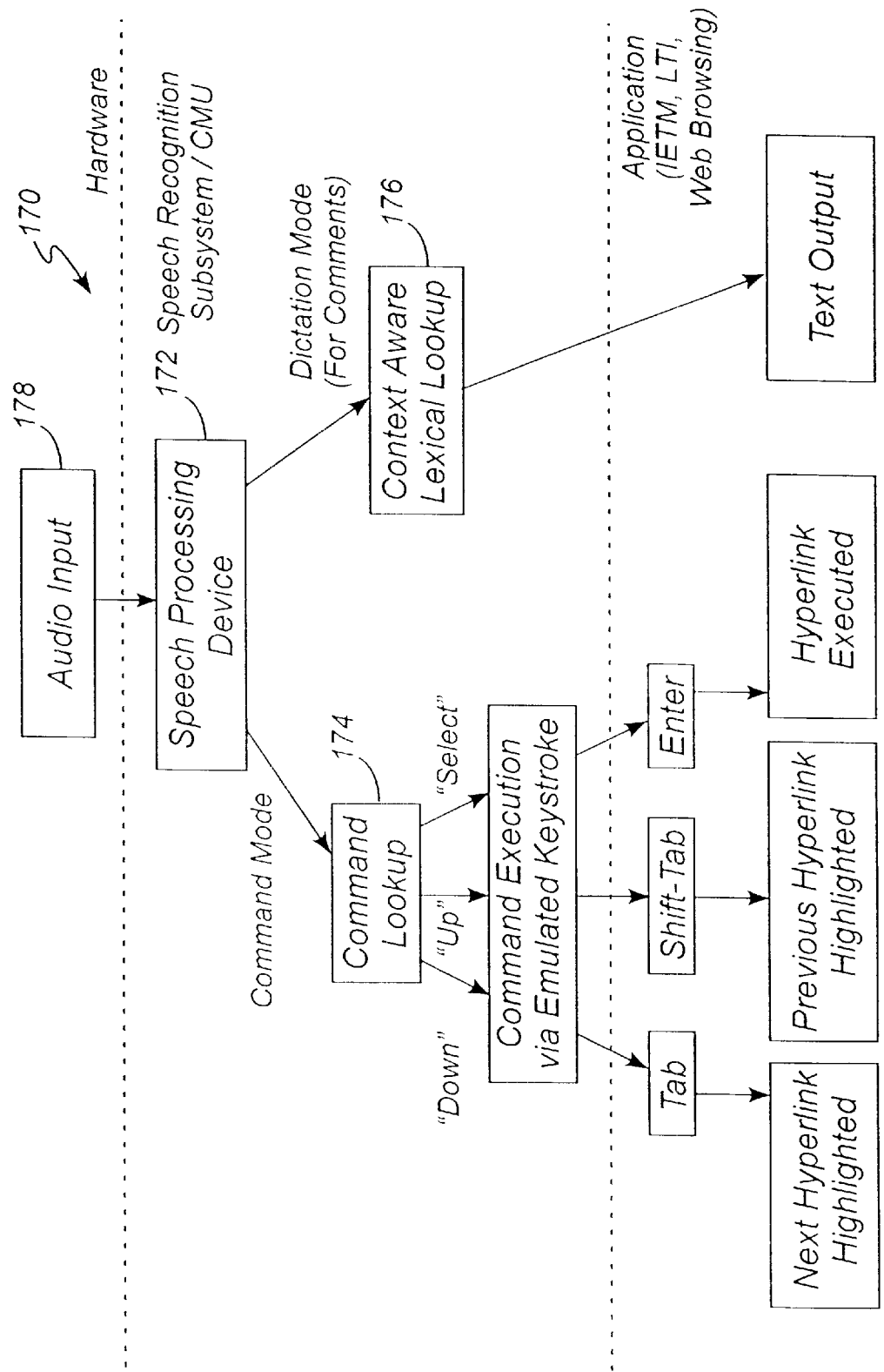
FIG. 21 is a flow chart illustrating the functioning of a speech command/recognition apparatus of the present invention.

FIG. 21 is a flow chart illustrating the functional aspects of a speech command/recognition apparatus that can be used with the present invention. The voice recognition apparatus 170 includes a speech processing device 172, a command lookup 174, a context lexical lookup 176 and an audio input device 178. The audio input device 178 can be any standard microphone mounted within the computer 12. The context lexical lookup 176 can take the form of any standard voice recognition software such as Dragonspeak manufactured by Dragon Systems, Inc., 320 Nevada Street, Newton, Mass. 02160. In the Command Mode, Command Lookup 174 is done in a speech application. The waveform is compared to the dictionary to search for the word spoken. In this case, it is a limited dictionary because it only looks up the words which were in the tags embedded in the page, making it an application specific dictionary. In the Dictation Mode, Context Aware Lexical Lookup performs a similar function, looks up what was said to make sure that it is grammatically correct, making it easier to find the word as well as being able to identify the difference between very similar words such as to, too, and two.

Referring to FIG. 7, the system command step 114 in this embodiment of the present invention can use the voice recognition apparatus 170. The user will speak the name of the hot spot he or she would like to select into the audio input device 178 and the term will then be forwarded to the command lookup 174 by the speech processing device 172, wherein the term will be matched with a term in the vocabulary of the voice recognition system software 176. The matching term will appear on the screen for the user to approve or disapprove. In some cases, there will be more than one term that is similar to the name of the desired hot spot and the user can scroll through the variety of terms and select one by depressing one of the switches 24a, 24b or 24c. The context lexical lookup 176 can be used for any comments the user would like to dictate and store during the maintenance test such as information regarding the appearance of the mechanisms, or missing parts. A clockwise rotation of the dial is mapped into the Tab, and counter-clockwise into the Shift-Tab. Pressing the Enter button causes execution. Consequently, a browser can be used without modification.

The present invention thus provides a wearable computer with hands-off access to text, images, maps, and other information needed to provide various operations and services. The ergonomic input device 20 is easy to learn and operate in an intuitive manner. As a maintenance assistant and advisor, the computer system 10 of the present invention can provide:

help in determining equipment status accurately and rapidly;

easily accessible and extensive expert information for on-the-job support;

job aid to insure accuracy and diminished need for extensive training; and status information to a fast automated system for problem sorting and generating work orders.

Figure 22:
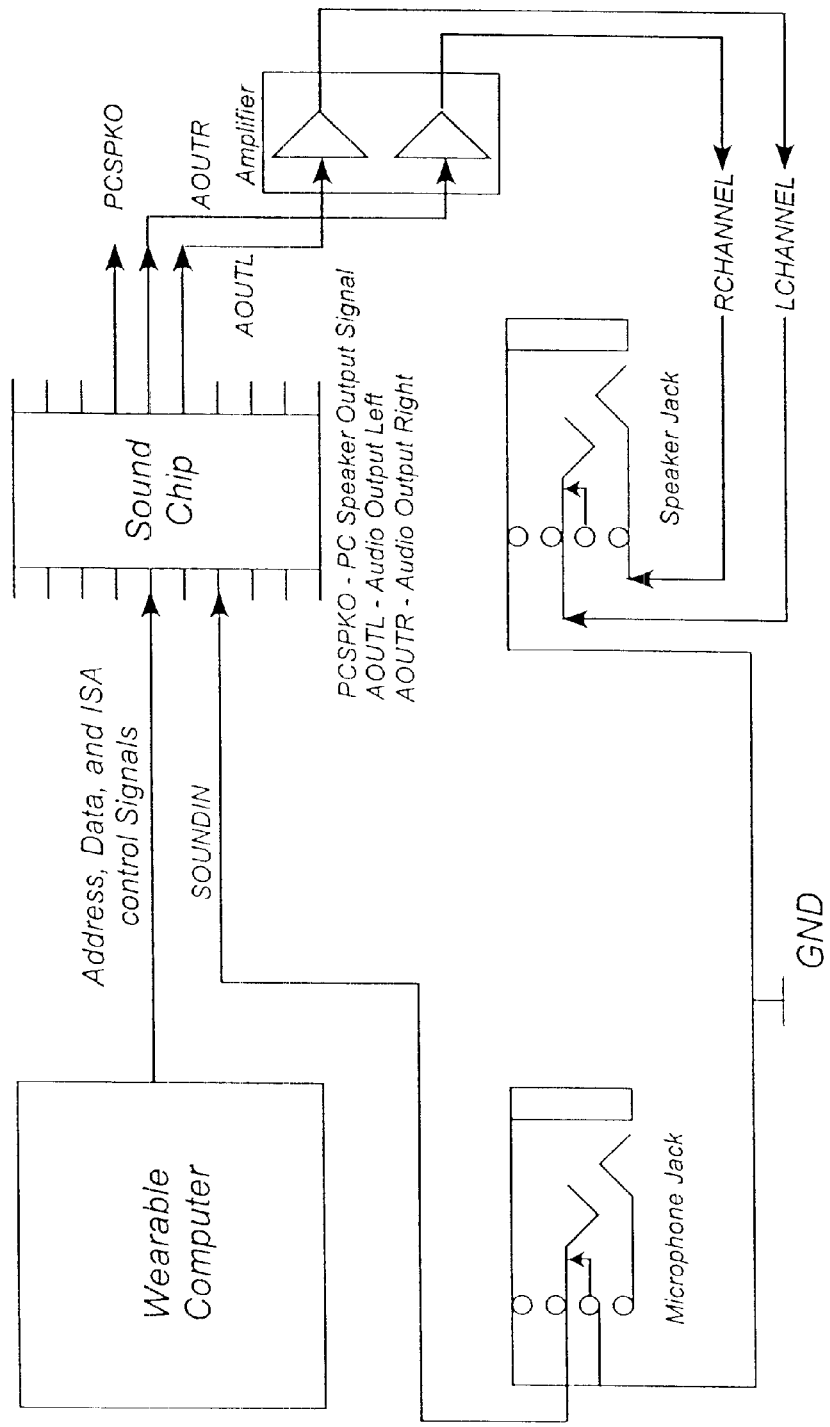
FIG. 22 is a schematic drawing of the speech command/recognition apparatus of the present invention shown in FIG. 21.

FIG. 22 illustrates connection among the wearable computer, sound chip, microphone and speaker jack. The microphone is an input device which sends a SOUNDIN signal to the sound chip. Three out of four terminals on the microphone jack are used. If the microphone is not plugged in, it is grounded and gets no sound. The SOUNDIN line delivers the speech waveform to the sound chip, where analog/digital and digital/analog conversions take place. The output signals are analog. The speaker has two channels, RCHANNEL and LCHANNEL.

Figure 23:
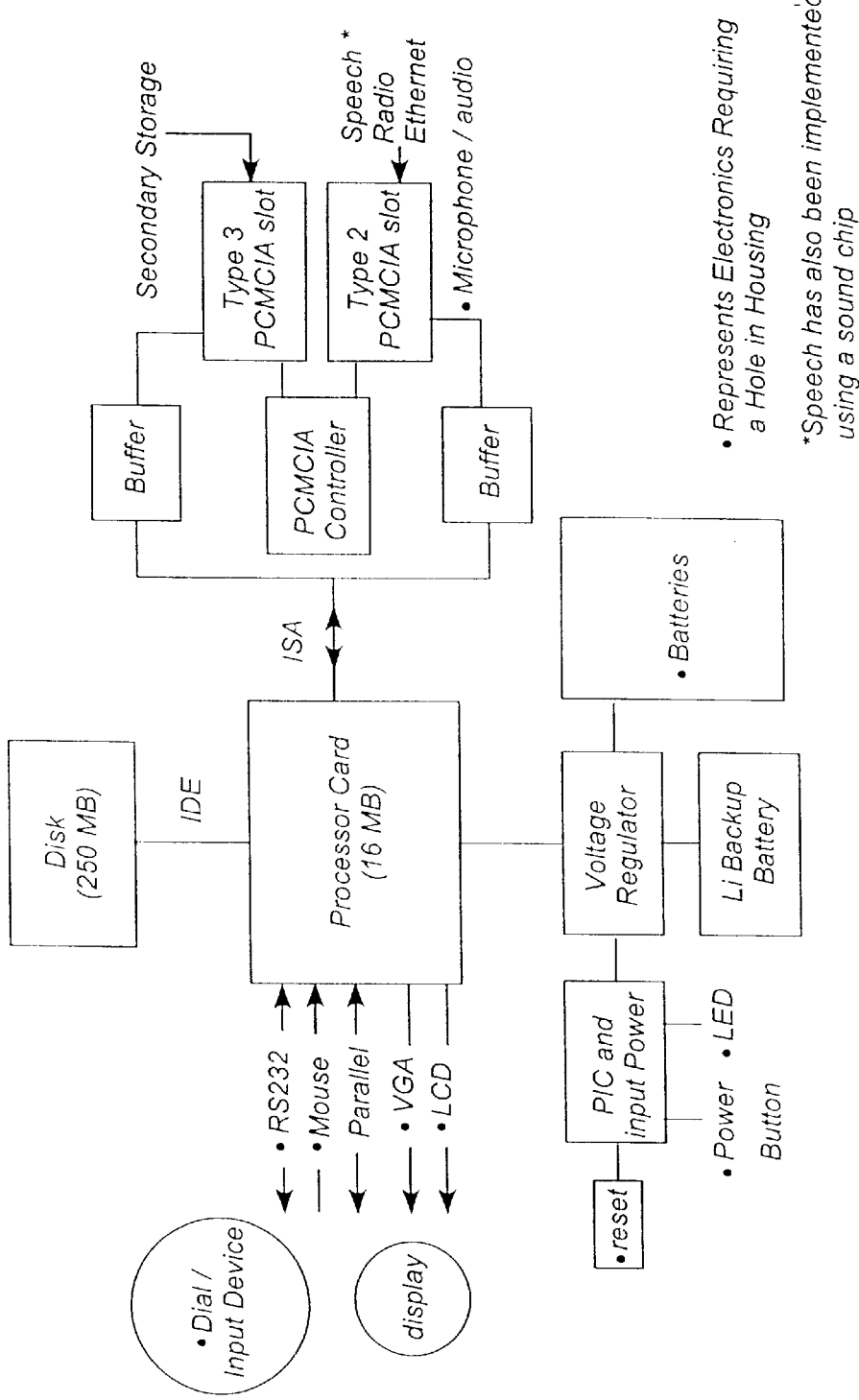
FIG. 23 is a high level block diagram of one embodiment of the present invention.

FIG. 23 is a high level block diagram of one embodiment of the present invention. CARDIO is located in the processor box. It is a processor card with up to 32 MB of DRAM, and serial, parallel and VGA ports. CARDIO is manufactured by EPSON Electronics America, Inc., 150 River Oaks Parkway, San Jose, Calif. 95134.

Figure 24:
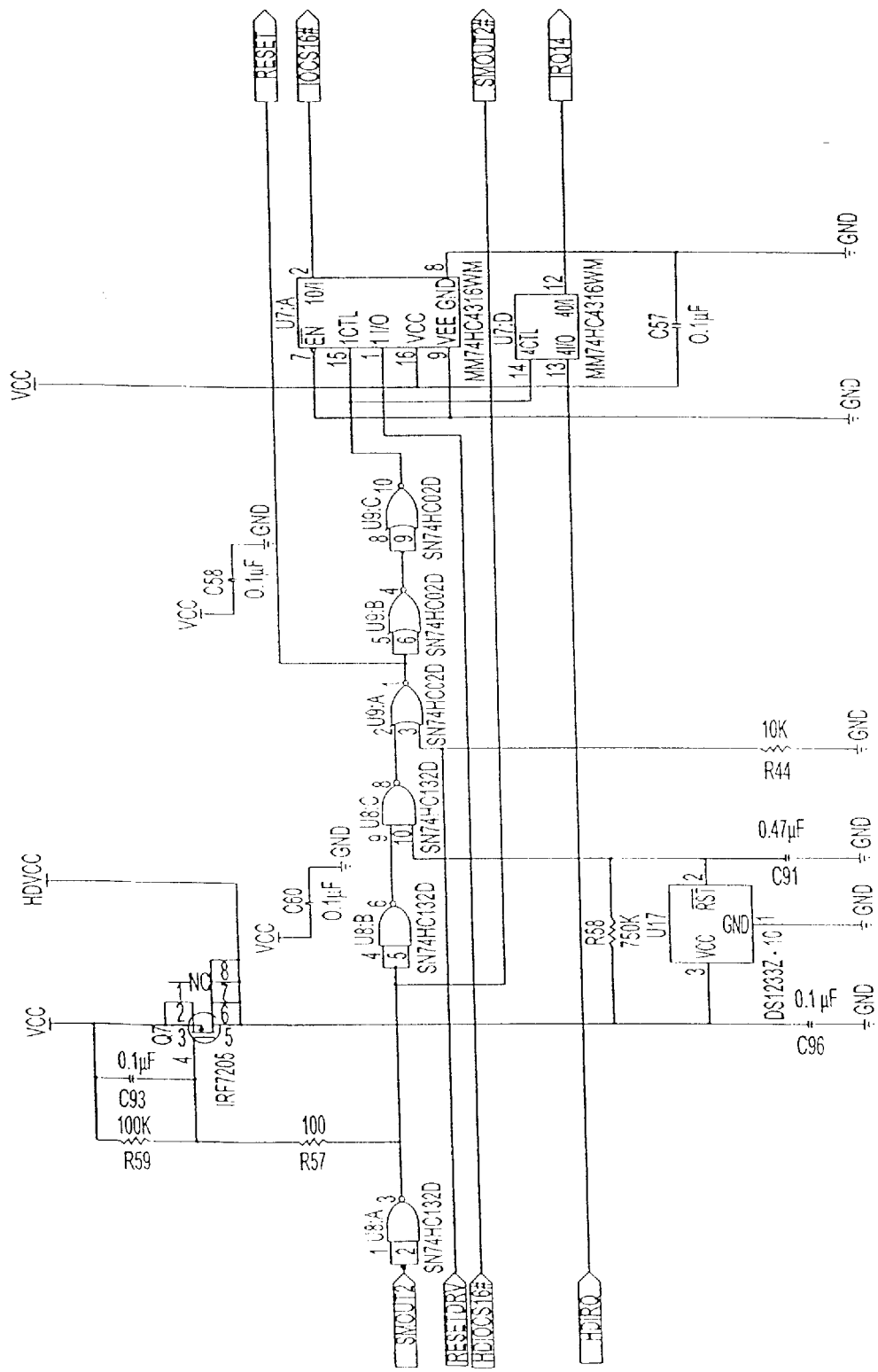
FIG. 24 illustrates the hard drive power controller.

FIG. 24 illustrates the hard drive power controller. That circuit monitors power to the hard drive and provides control signals, such as a RESET signal for resetting the drive after stand-by mode, an IOCS16# signal which is a 16 bit I/O transfer request from the hard drive to CARDIO, a SMOUT2# signal is used to control power to the hard drive and place it in a low power mode, and an IRQ14 signal which is an interrupt signal from the hard drive to CARDIO. Integrated circuits U7:A and U7:D are quad analog switches with level translators.

Figure 25A:
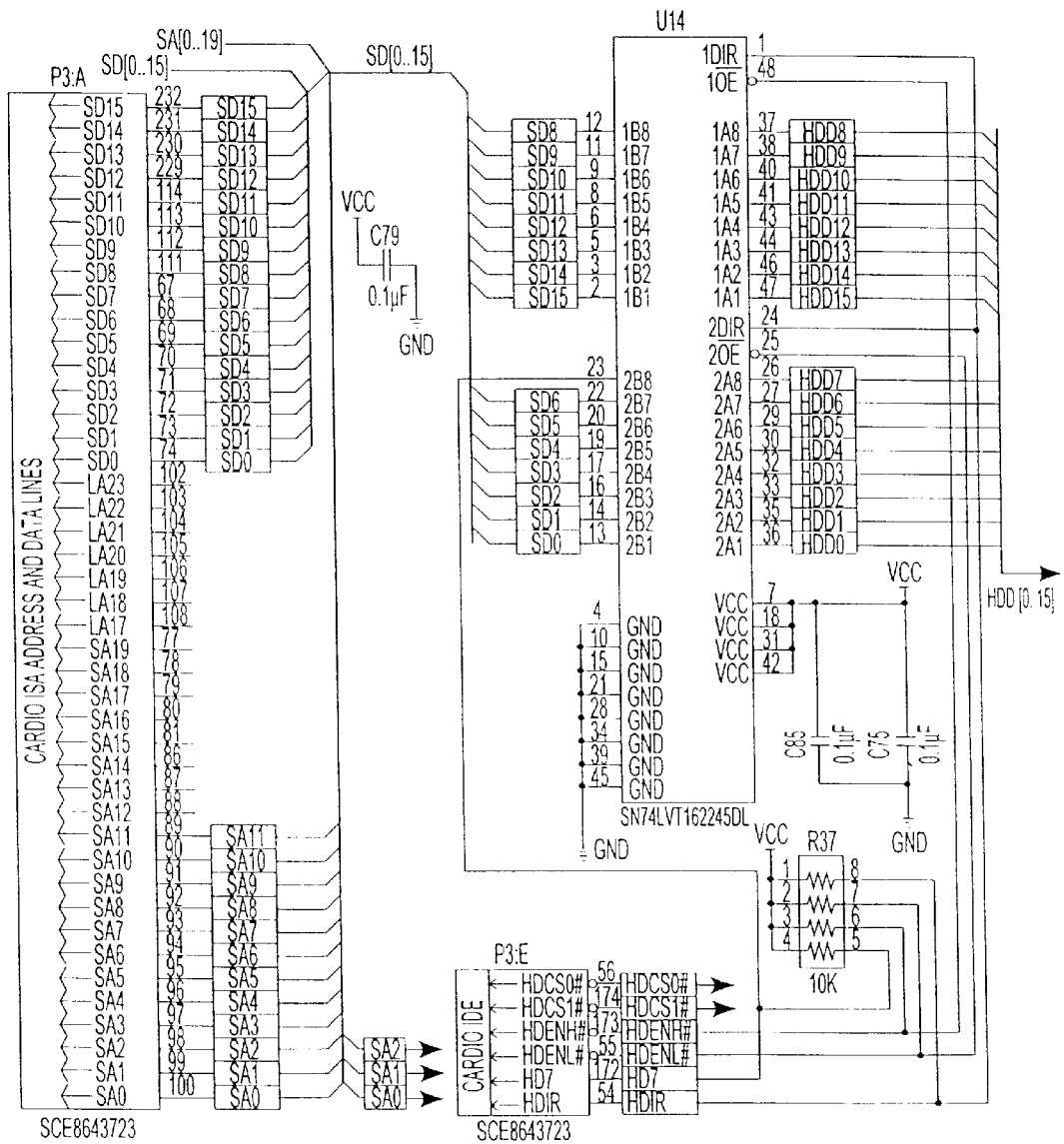
FIG. 25 illustrates the connection between the CARDIO processor card and the hard drive.
Figure 25B:
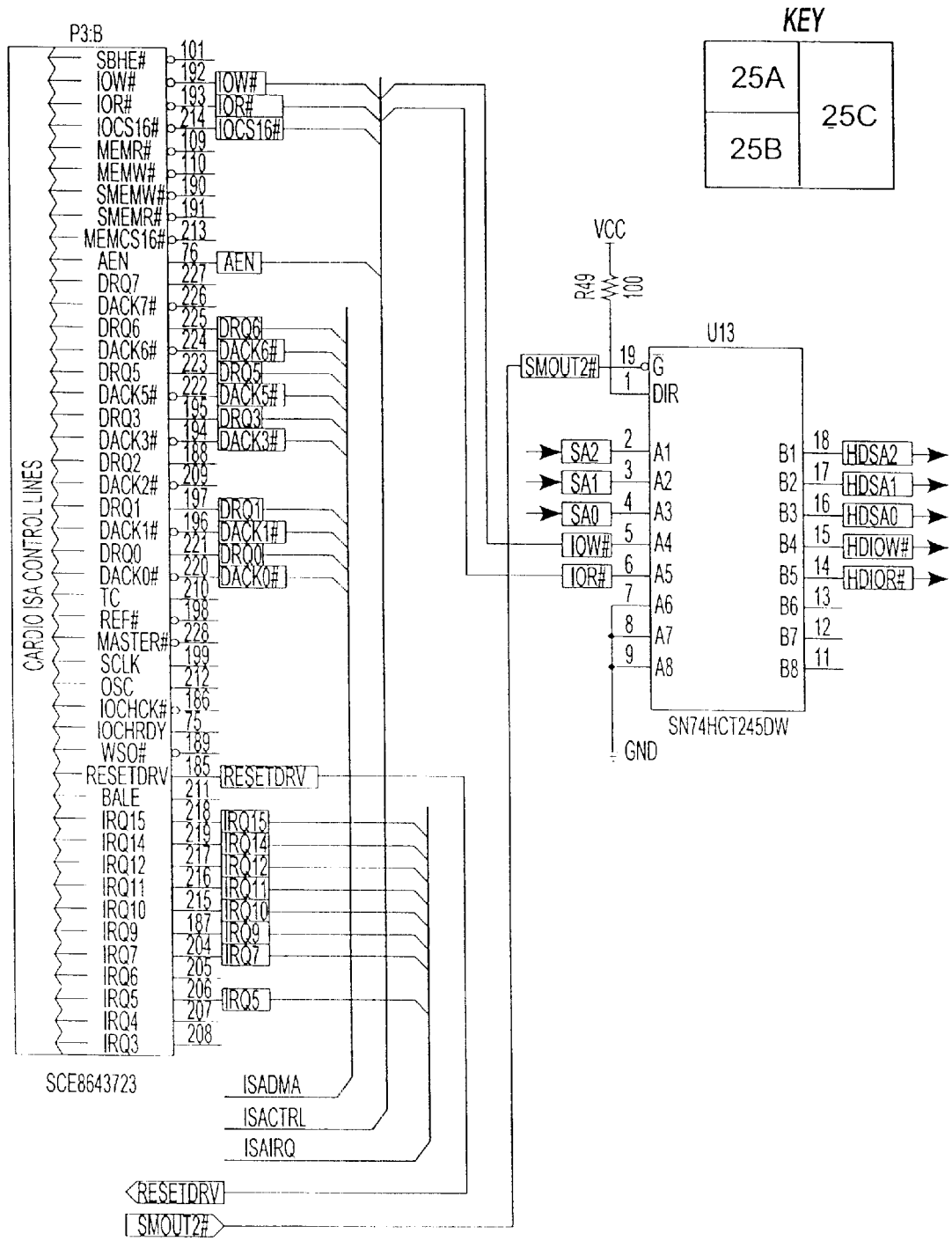
Figure 25C:
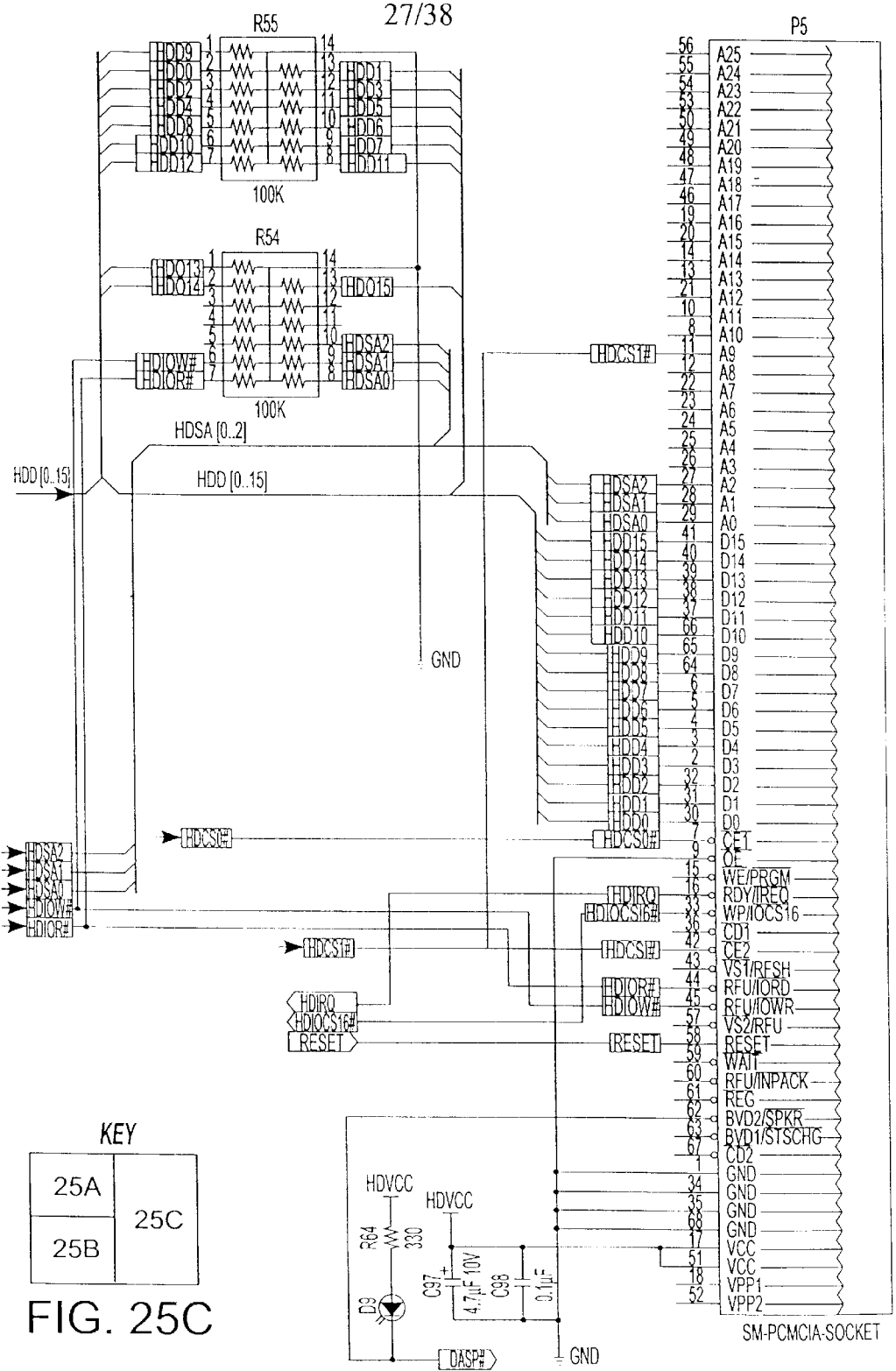

FIG. 25 illustrates the connection between the CARDIO processor card and the hard drive. The circuit includes integrated circuit U13 which is a bus transceiver which buffers address lines between the CARDIO card and the hard drive. It also includes integrated circuit U14 which is a bus transceiver which buffers data lines between the CARDIO card and the hard drive. Connector P3:E is a connection to the hard drive. Both U13 and U14 may be obtained from Phillips Semiconductors, Sunnyvale, Calif.

Figure 26A:
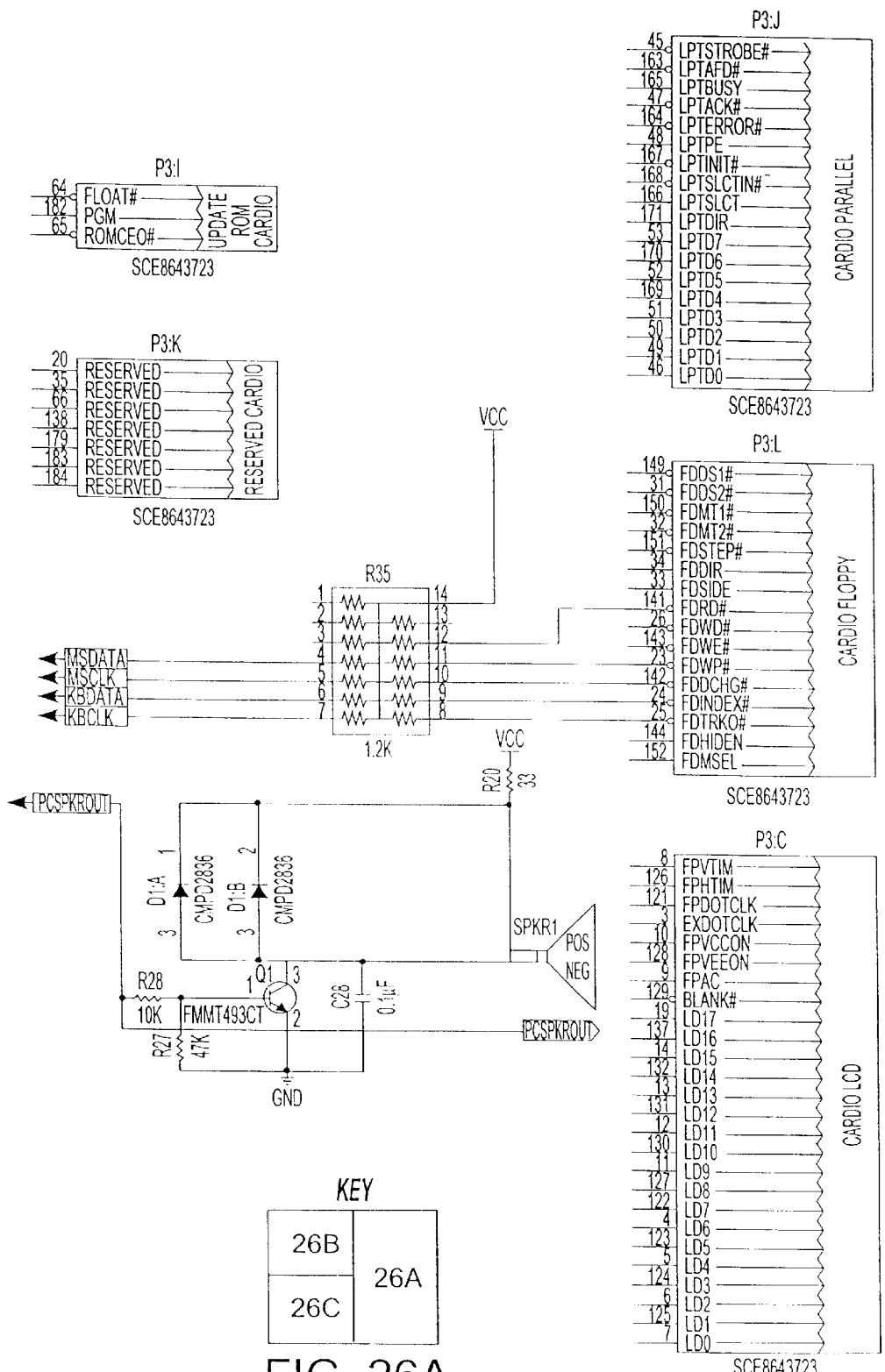
FIG. 26 illustrates peripheral connections.
Figure 26B:
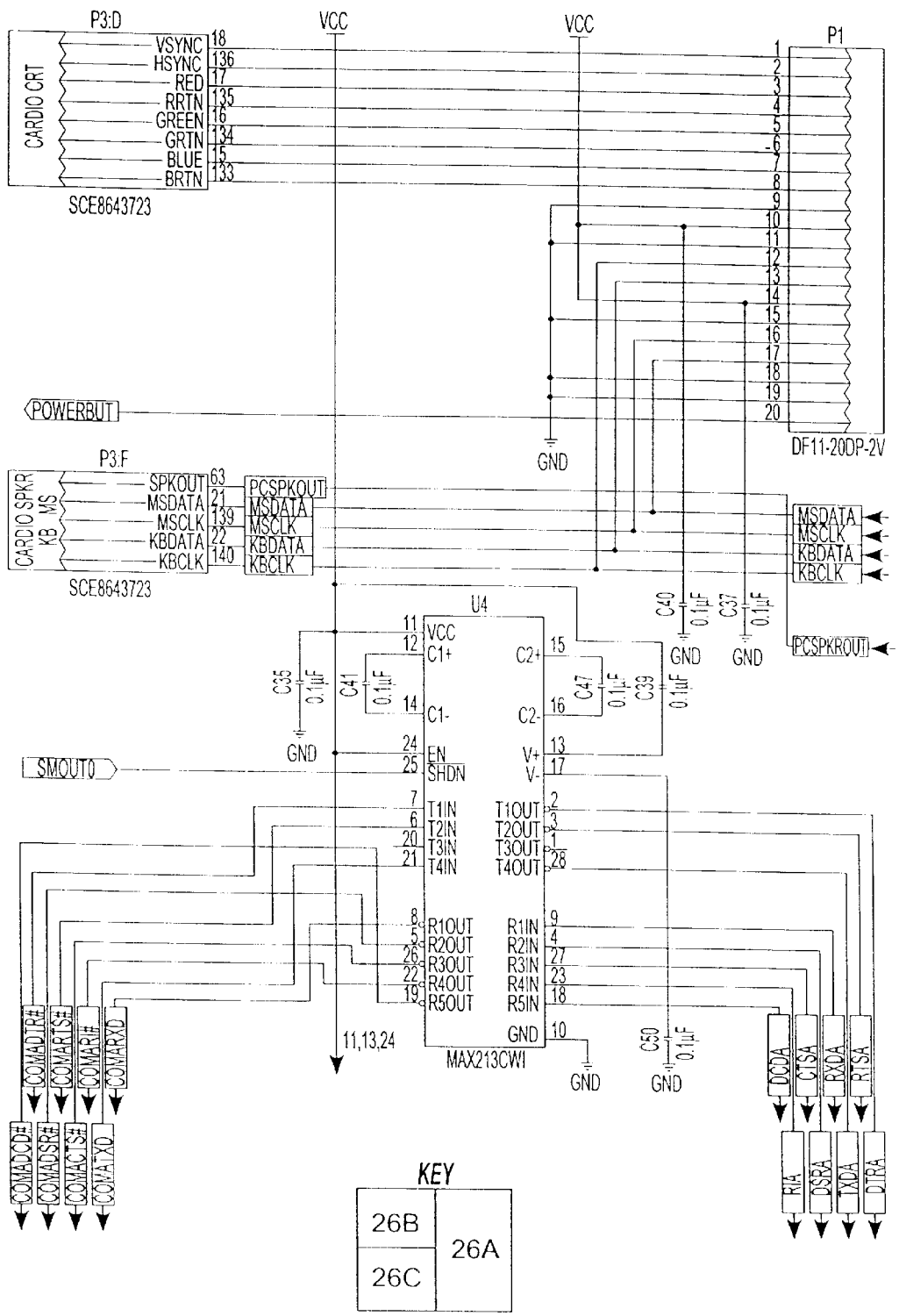
Figure 26C:
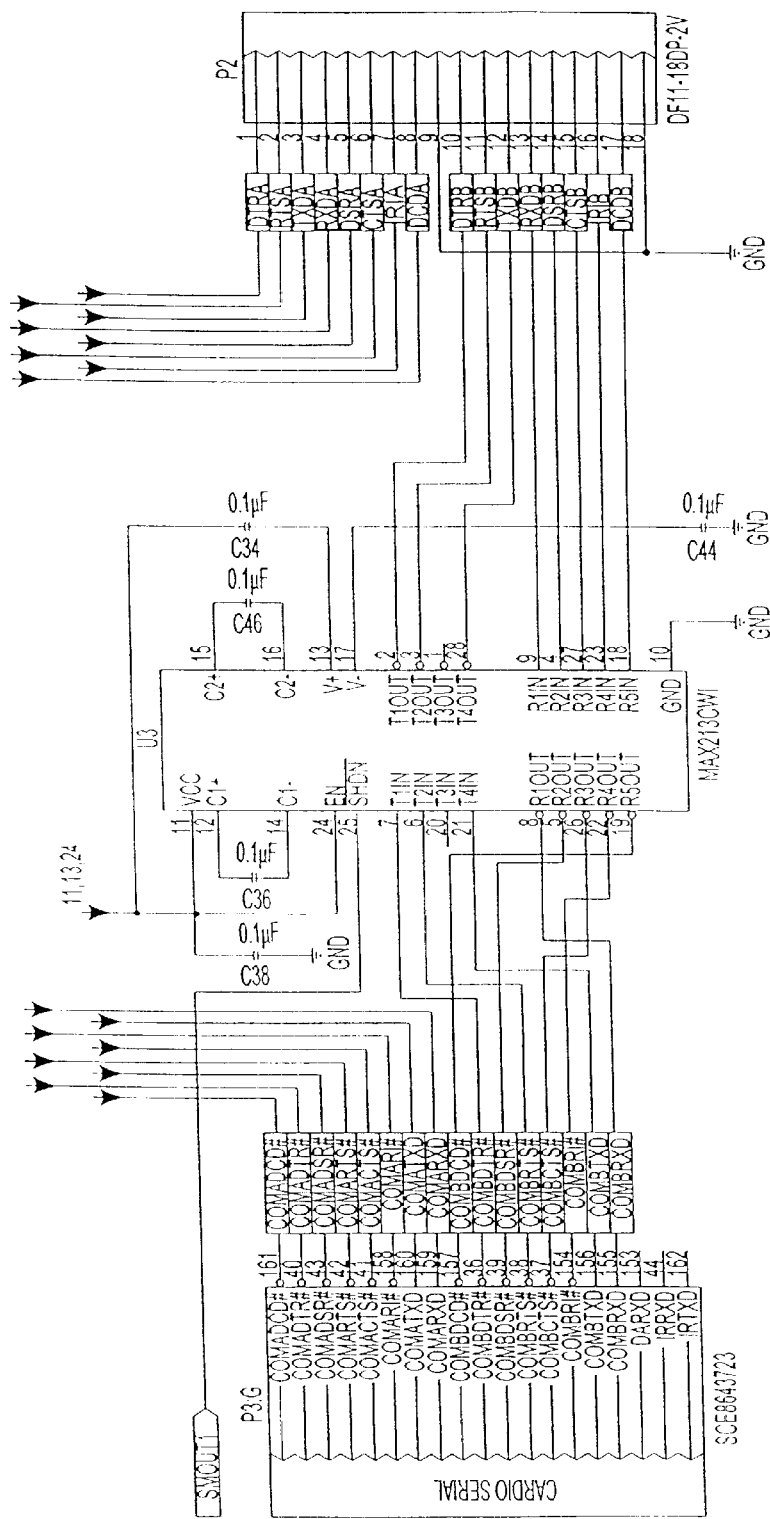
Figure 27A:
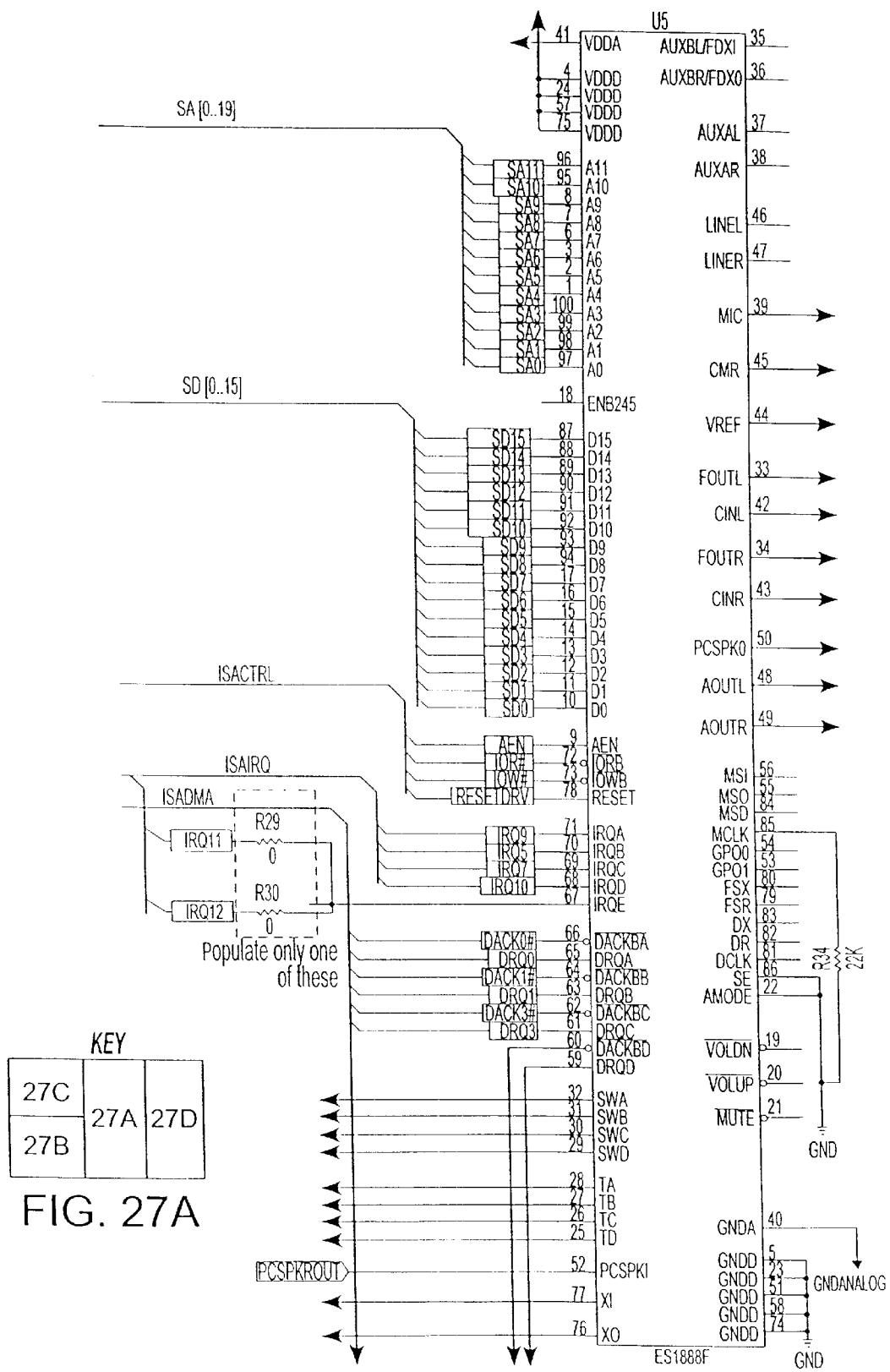
FIG. 27 illustrates the sound chip U5 and associated circuitry.
Figure 27B:
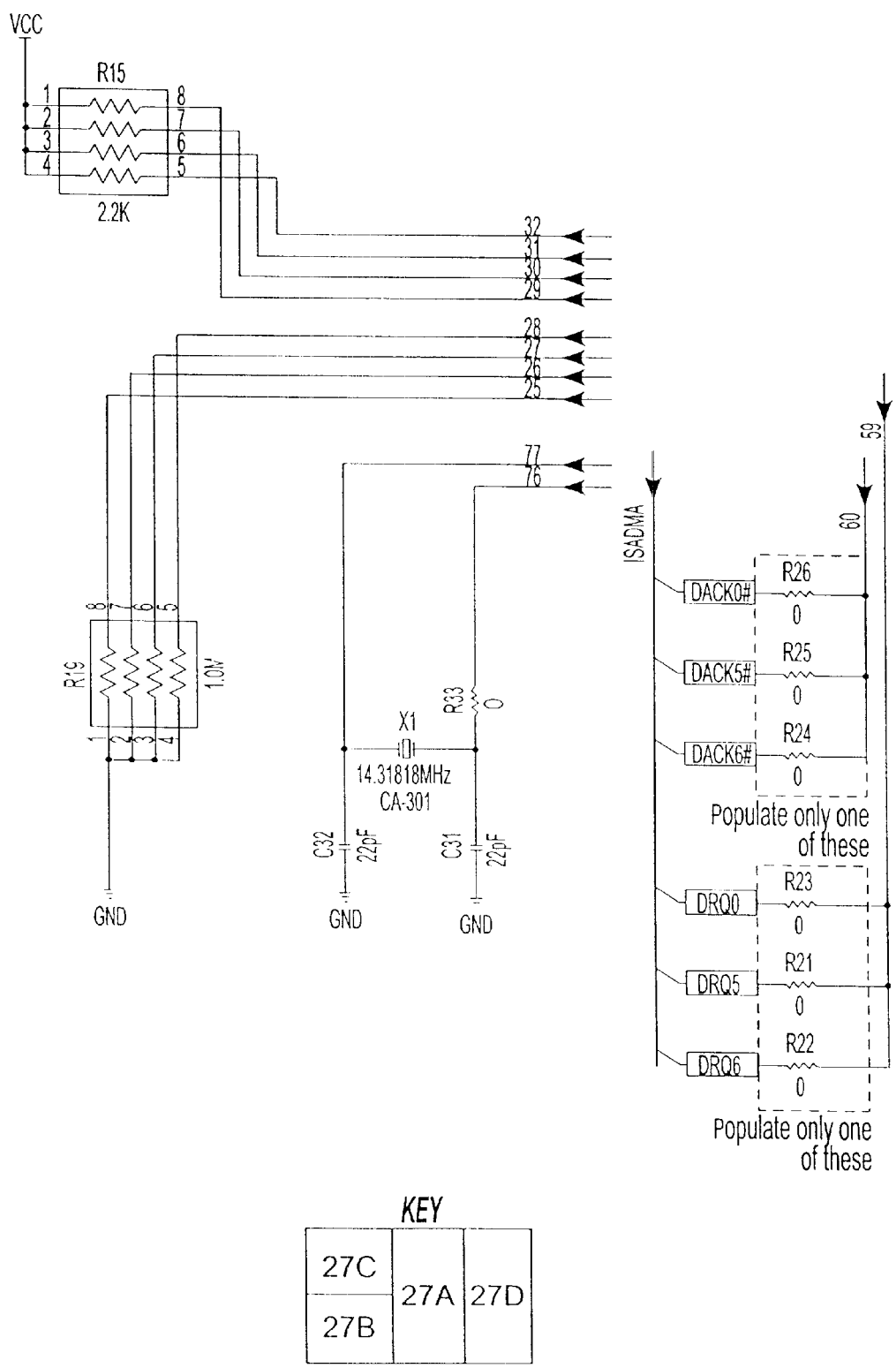
Figure 27C:
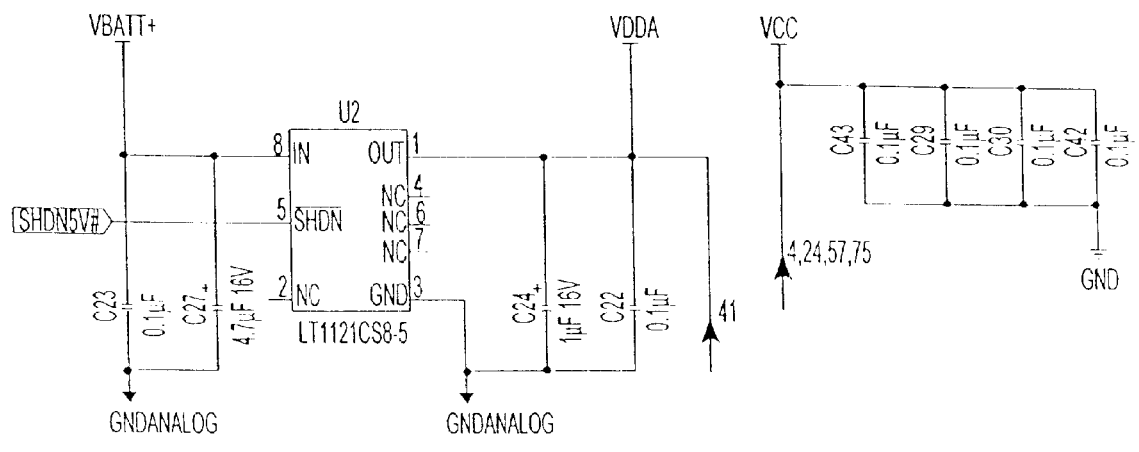
Figure 27D:
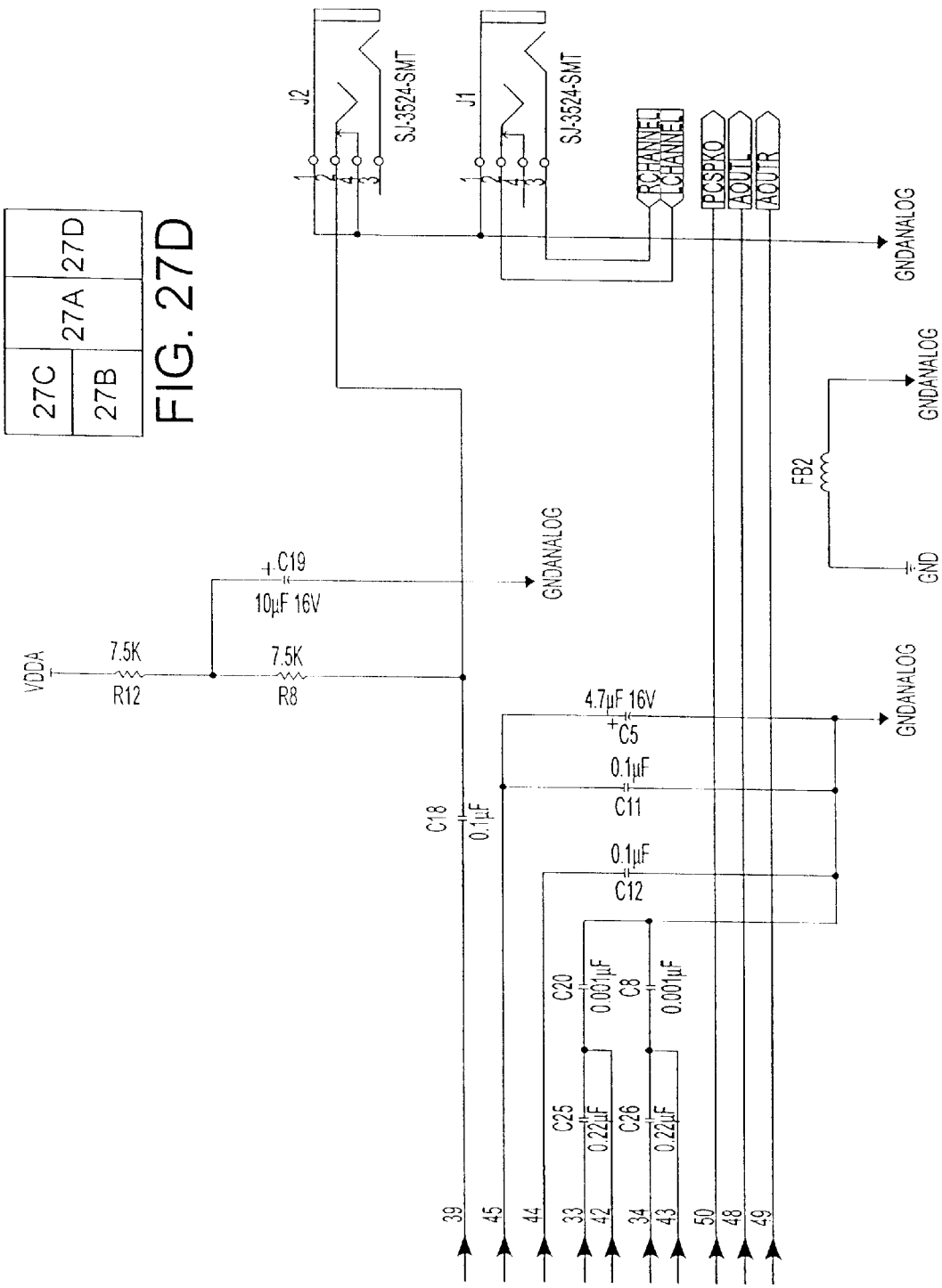

FIG. 26 illustrates peripheral connections. Integrated circuits U3 and U4 are voltage converters between +5 volt logic to +/–10 volt logic. Connector P3:G transmits and receives +5 volt logic signals from the CARDIO card (See FIG. 25) and connector P2 transmits and receives +/–10 volt logic to a modem port. Connector P3:F is a speaker interface connection and connector P3:D is a monitor interface connection. A speaker, SPKR1, provides output from a voice synthesizer. Other connectors are illustrated for a floppy drive, a parallel port, and a LCD display. Some of those connections are illustrated as not being utilized, although they may be utilized in other embodiments of the invention.

FIG. 27 illustrates the sound chip U5 and associated circuitry. The sound chip may be obtained from ESS Technology, Inc., 1888 Audio Drive, Freemont, Calif. In the illustrated embodiment, the sound chip is a full duplex, record and playback sound synthesizer. Connector J1 is a speaker jack and J2 is a microphone jack.

Figure 28:
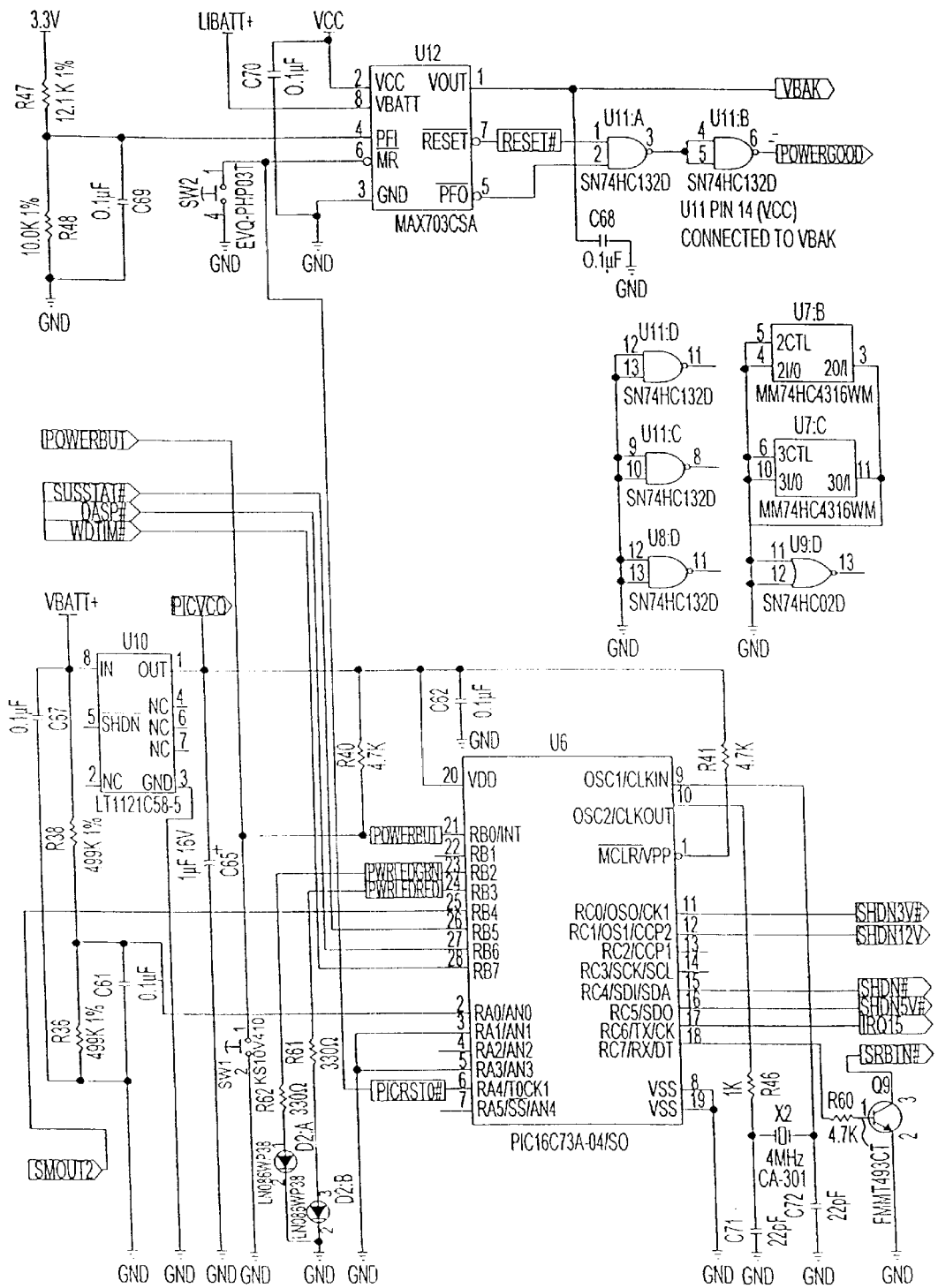
FIG. 28 illustrates a microcontroller and power management circuit.

FIG. 28 illustrates a microcontroller and power management circuit. Integrated circuit U6 is a programmable microcontroller. In the illustrated embodiment it is an 8 bit CMOS device, with analog-to-digital converters, EPROM memory, and power savings features. The power savings feature puts the device in low power or "sleep mode" when predetermined conditions exist. It also controls LEDs D2:A and D2:B to indicate the power status of the system, as described hereinbelow with respect to FIG. 31. The microcontroller may be obtained from Microchip Technology, Inc.,2355 West Chandler Boulevard, Chandler Ariz. Integrated circuit U10 monitors the voltage of the system and, when the voltage falls below a predetermined level, such as below about 1.8 volts in a 3.3 volt system, provides a signal to the microcontroller U6 indicating that the system should enter low power mode. Integrated circuit U12 provides supervisory functions and has a battery back-up. It may be obtained from Maxim Integrated Products, Sunnyvale, Calif.

Figure 29:
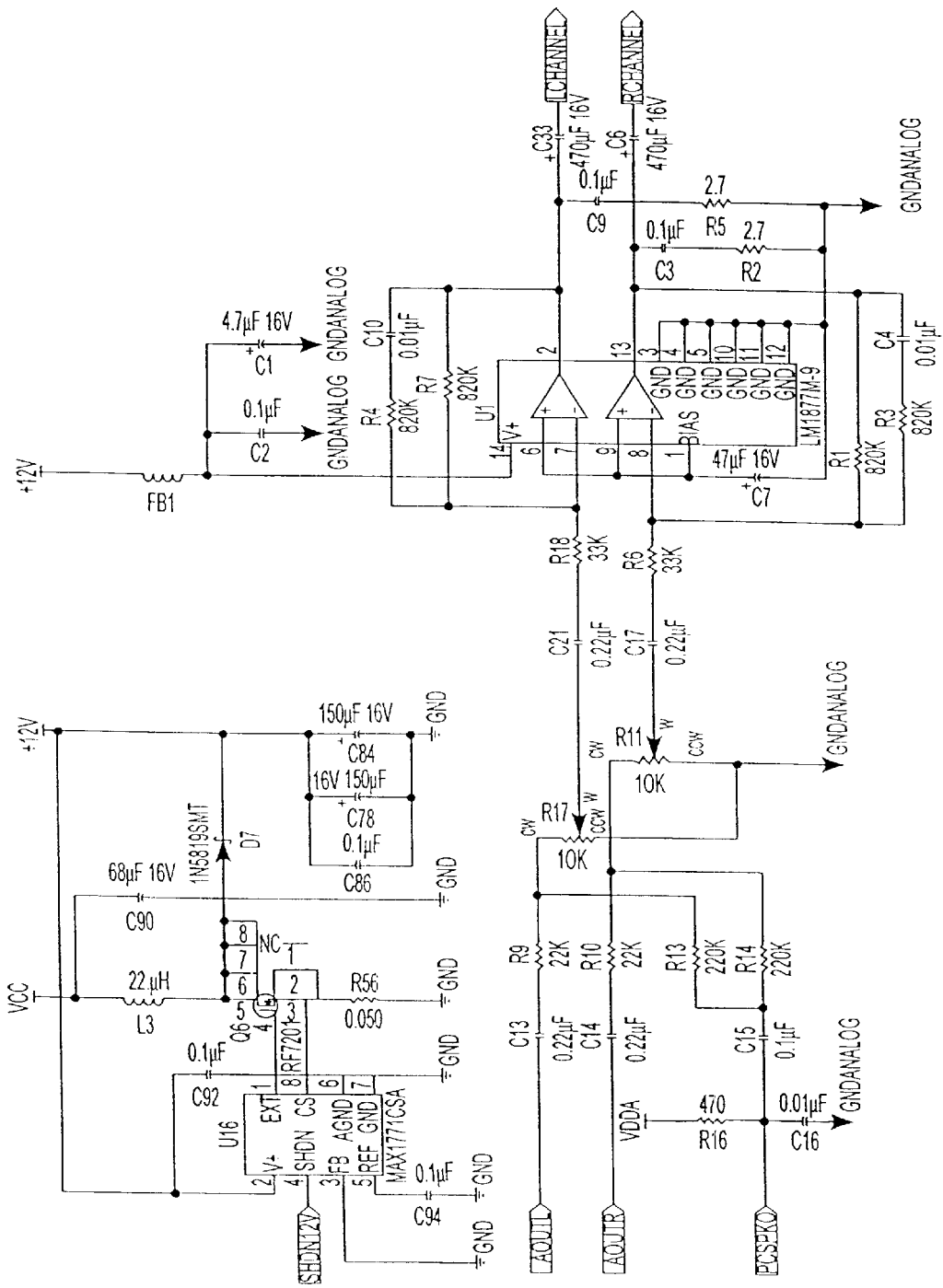
FIG. 29 illustrates an analog audio amplifier circuit.

FIG. 29 illustrates an analog audio amplifier circuit. Integrated circuit U1 is a dual audio power amplifier available from Linear Technology, Inc. It receives two channels of audio input and provides two channels of amplified output. Integrated circuit U16 is 5 volt input, 12 volt output power supply available from Maxim Integrated Products.

Figure 30:
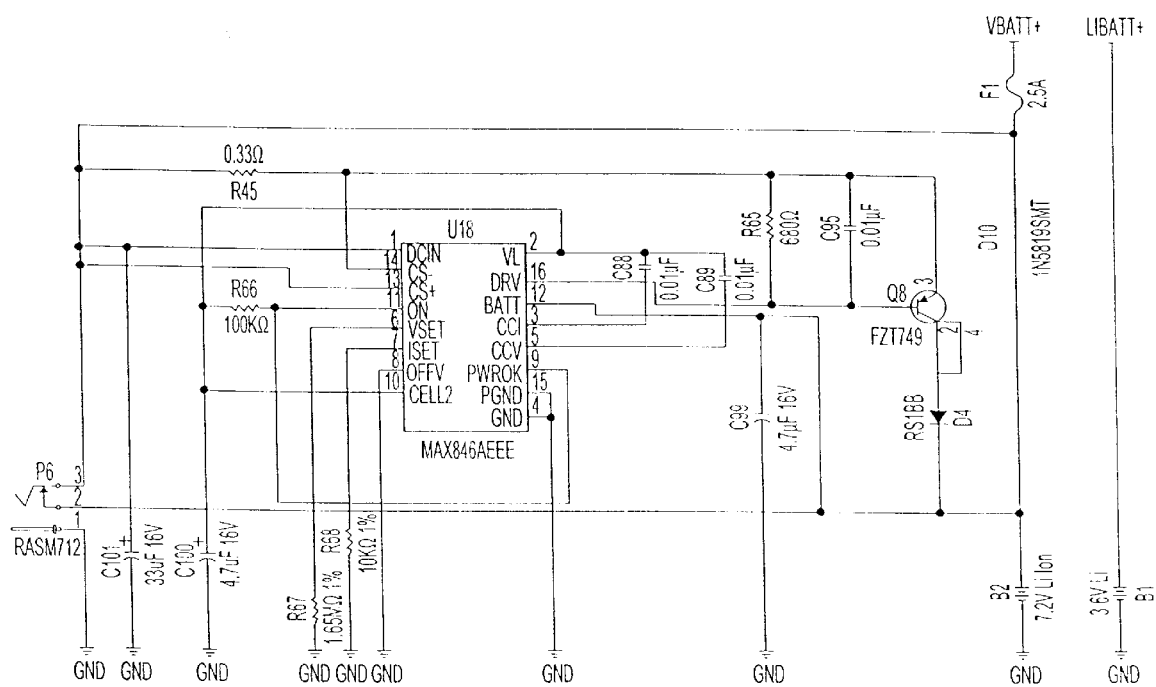
FIG. 30 illustrates a batter and charger circuit.

FIG. 30 illustrates a batter and charger circuit. Integrated circuit U18 is a 16 bit, multi-chemistry battery charging device available from Maxim Integrated Products. Battery B1 is a 3.6 volt lithium backup battery and battery B2 is a 7.2 volt lithium ion battery that acts as the primary power source.

Figure 31:
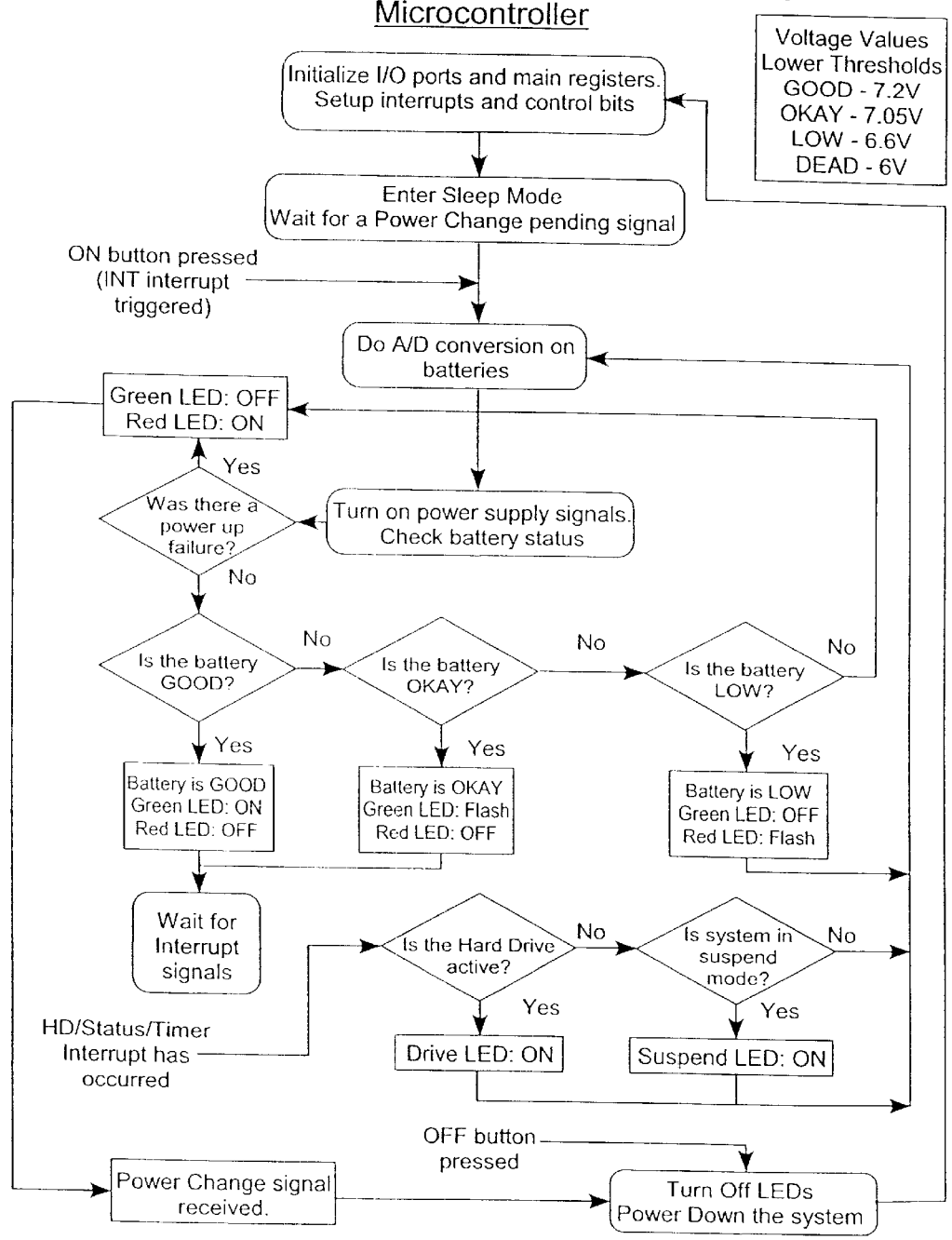
FIG. 31 is a flow diagram illustrating the operation of the battery status and the hard drive monitoring using the PIC microcontroller.

FIG. 31 is a flow diagram illustrating the operation of the battery status and the hard drive monitoring using the PIC microcontroller.

Although the present invention has been described in conjunction with preferred embodiments thereof, it is expected that many modifications and variations will be developed. This disclosure and the following claims are intended to cover all such modifications and variations.

What is claimed is:

1. A portable computer system, comprising:
   a housing having a surface;
   a processing unit in said housing;
   a two-dimensional display having information displayed thereon, certain of the information being hot spots which include hypertext links, said display being connected to said processing unit;
   a first input rotary switch in said housing and having a single degree of freedom;
   a second input switch in said housing, said first and second input switches carried on said surface of said housing; and
   an input interface connected between said first and second input switches and to said processing unit.

2. The computer system of claim 1 further comprising a third input device.

3. The computer system of claim 1 wherein said second input switch includes a plurality of pushbutton switches.

4. The computer system of claim 1, wherein said display includes a headband carrying said display.

5. The computer system of claim 2, wherein said third input device is an audio recognition device.

6. The computer system of claim 1, wherein said interface includes a microcontroller.

7. The computer system of claim 1, wherein the hypertext links direct the user to World Wide Web pages on the Internet.

8. The computer system of claim 1, wherein the hypertext links direct the user to an interactive electronic manual.

9. A portable computer system having an ergonomic input device, comprising:
   a housing having a surface;
   a central processing unit in said housing;
   a two dimensional display having information, wherein certain of the information is selectable by the user and said selectable information includes hypertext links, said display being is connected to said central processing unit;
   a first input rotary switch in said housing and having a single degree of freedom for producing a first signal;
   a second input switch in said housing for producing a second signal, said first and second input switches being carried on said surface of said housing; and
   software running on said central processing unit, said software for receiving said first and second signals and for mapping said first signal to one of a number of positions on said display, in a predetermined sequence, without moving all of said information being selectable by the user, and for selecting certain information in response to said second signal, and in the case that the certain information is a hypertext link, said software reads the hypertext mark up language and displays the hypertext page on the display.

10. The computer system of claim 9, further comprising a third input device being an audio recognition device.

11. The computer system of claim 9, wherein said hypertext links are connected to an interactive electronic manual.

12. The computer system of claim 9, wherein said hypertext links are connected to World Wide Web pages on the Internet.

13. The computer system of claim 9, wherein said second signal causes said central processing unit to perform a function that is related to the displayed information.

14. A computer system, comprising:
    a housing having a surface;
    a central processing unit in said housing;
    a two-dimensional display connected to said central processing unit, said display having a plurality of information items, wherein the information items include hypertext links;
    a first input rotary switch in said housing and having a single degree of freedom;
    a second input switch in said housing, said first and second switches being carried on said surface of said housing; and
    means for cycling through a predetermined order of information items in a first direction, without moving all of said information items, in response to rotation of said rotary switch in a first direction and for cycling through said predetermined order of information items in an opposite direction, without moving all of said information items, in response to rotation of said rotary switch in a direction opposite to said first direction, and for selecting an information item in response to said second signal, wherein if the information item is a hypertext link the associated hypertext page will be displayed on said display.

15. The computer system of claim 14, further comprising a third input device comprising an audio recognition device.

16. The computer system of claim 15, wherein said hypertext links are connected to World Wide Web pages on the Internet.

17. The computer system of claim 14 wherein said hypertext links are connected to an interactive electronic manual.

18. A method of navigating World Wide Web pages on the Internet using a portable computer system having a display, a first input device, a second input device and a processor, comprising:
    providing information including a sequence of hot spots of hypertext links to World Wide Web pages found on the Internet on the display;
    moving, in a predetermined order, through said sequence of hot spots on the display in one of a first direction and a second direction, without moving all of said hot spots, wherein the movement from each said hot spot to the adjacent hot spot in said sequence coincides with the displacement in one of a first clockwise direction and a second counterclockwise direction, respectively, of a first rotary input switch having a single degree of freedom; and
    selecting a hot spot in response to a second input signal from a second input switch, wherein when the selected hot spot is a hypertext link, the World Wide Web page will be displayed on the display.

19. The method according to claim 18, wherein the portable computer further comprising a third input device being an audio recognition device and the method further comprises selecting a predetermined region on display by speaking into the audio recognition device.

20. A method of navigating hypertext links using a portable computer system having a display, a first input device, a second input device and a processor, comprising:

providing information including a sequence of hot spots of hypertext links to hypertext pages on the display;

moving, in a predetermined order, through said sequence of hot spots on the display in one of first and second directions, without moving all of said hot spots, the movement from each said hot spot to the adjacent hot spot in said sequence coincides with the displacement in one of a first clockwise direction and a second counterclockwise direction, respectively, of a first rotary input switch having a single degree of freedom; and selecting a hot spot in response to a second input signal from a second input switch, wherein when the selected hot spot is a hypertext link, the hypertext page will be displayed on the display.

21. The method according to claim 20, wherein providing that the information on the display is an interactive electronic manual for servicing a machine and includes hypertext links.

22. The method according to claim 20, wherein the portable computer has a third input device which is an audio recognition device and the method further comprises speaking the command into the audio recognition device to select a hot spot in response to a second input signal.

23. A portable computer system, comprising:

a housing having a surface;

a processing unit in said housing;

a two-dimensional display having information displayed thereon, certain of the information being hot spots that include hypertext links, said display being connected to said processing unit;

a first input rotary switch in said housing and having a single degree of freedom for producing a first signal for identifying the information to be selected;

at least one second input switch in said housing positioned at a periphery of said first input rotary switch for producing a second signal for selecting the identified information, said first and second input switches carried on said surface of said housing; and an input interface connected between said first and second input switches and said processing unit for communicating said first and second signals to said processing unit.

24. The computer system of claim 23 further comprising a third input device.

25. The computer system of claim 23 wherein said second input switch includes a plurality of pushbutton switches.

26. The computer system of claim 23, wherein said display includes a headband carrying said display.

27. The computer system of claim 24, wherein said third input device is an audio recognition device.

28. The computer system of claim 23, wherein said interface includes a microcontroller.

29. The computer system of claim 23, wherein the hypertext links direct the user to World Wide Web pages on the Internet.

30. The computer system of claim 23, wherein the hypertext links direct the user to an interactive electronic manual.

31. A portable computer system having an ergonomic input device, comprising:

a housing having a surface;

a central processing unit in said housing;

a two dimensional display having information, wherein certain of the information is selectable by the user and said selectable information includes hypertext links, said display being connected to said central processing unit;

a first input rotary switch in said housing and having a single degree of freedom for producing a first signal;

at least one second input switch in said housing positioned at a periphery of said first input rotary switch for producing a second signal, said first and second input switches being carried on said surface of said housing; and software running on said central processing unit, said software for receiving said first and second signals and for mapping said first signal to one of a number of positions on said display, in a predetermined sequence, without moving all of said information being selectable by the user, and for selecting certain information in response to said second signal, and in the case that the certain information is a hypertext link, said software reads the hypertext mark up language and displays the hypertext page on the display.

32. The computer system of claim 31 further comprising a third input device comprised of an audio recognition device.

33. The computer system of claim 31 wherein said hypertext links are connected to an interactive electronic manual.

34. The computer system of claim 31 wherein said hypertext links are connected to World Wide Web pages on the Internet.

35. The computer system of claim 31 wherein said second signal causes said central processing unit to perform a function that is related to the displayed information.

36. A computer system, comprising:

a housing having a surface;

a central processing unit in said housing;

a two-dimensional display connected to said central processing unit, said display having a plurality of information items, wherein the information items include hypertext links;

a first input rotary switch in said housing and having a single degree of freedom;

at least one second input switch in said housing positioned at a periphery of said first input rotary switch, said first and second switches being carried on said surface of said housing; and means for cycling through a predetermined order of information items in a first direction, without moving all of said information items, in response to rotation of said rotary switch in a first direction and for cycling through said predetermined order of information items in an opposite direction, without moving all of said information items, in response to rotation of said rotary switch in a direction opposite to said first direction, and for selecting an information item in response to said second signal, wherein if the information item is a hypertext link the associated hypertext page will be displayed on said display.

37. The computer system of claim 36 further comprising a third input device comprising an audio recognition device.

38. The computer system of claim 36 wherein said hypertext links are connected to World Wide Web pages on the Internet.

39. The computer system of claim 36 wherein said hypertext links are connected to an interactive electronic manual.

* * * * *

UNITED STATES PATENT AND TRADEMARK OFFICE
CERTIFICATE OF CORRECTION

PATENT NO. : 6,567,079 B1
DATED : May 20, 2003
INVENTOR(S) : Smailagic et al.

It is certified that error appears in the above-identified patent and that said Letters Patent is hereby corrected as shown below:

Title page,
Item [56], References Cited, OTHER PUBLICATIONS,
"Asim Smailagic et al." reference, delete "Cmputer" and substitute -- Computer --.
"Bryce Gogswell et al." reference, delete "Copmuters" and substitute -- Computers --.

Column 3,
Line 15, delete "." and substitute -- ; --.

Column 8,
Line 47, after "box", insert -- . --.

Column 10,
Line 2, delete "difference" and substitute -- different --.
Line 39, delete "hyper-text" and substitute -- hypertext --.

Column 12,
Line 53, after "Chandler", insert -- , --.

Column 14,
Line 66, after "on", insert -- the --.

Column 15,
Line 66, after "two", insert -- , --.

Signed and Sealed this

Fourteenth Day of March, 2006

JON W. DUDAS
*Director of the United States Patent and Trademark Office*